(12) United States Patent
Yoshida et al.

(10) Patent No.: US 12,184,911 B2
(45) Date of Patent: Dec. 31, 2024

(54) COMPUTER PROGRAM, METHOD, AND SERVER APPARATUS

(71) Applicant: GREE, Inc., Tokyo (JP)

(72) Inventors: Akashi Yoshida, Tokyo (JP); Tomio Fujii, Tokyo (JP); Aya Kurabuchi, Tokyo (JP); Tomoki Morita, Tokyo (JP)

(73) Assignee: GREE, INC., Tokyo (JP)

( * ) Notice: Subject to any disclaimer, the term of this patent is extended or adjusted under 35 U.S.C. 154(b) by 3 days.

(21) Appl. No.: 17/486,947

(22) Filed: Sep. 28, 2021

(65) Prior Publication Data

US 2022/0103873 A1 Mar. 31, 2022

(30) Foreign Application Priority Data

Sep. 28, 2020 (JP) .................................. 2020-162381

(51) Int. Cl.
*H04N 21/2387* (2011.01)
*H04N 21/239* (2011.01)
(Continued)

(52) U.S. Cl.
CPC ..... *H04N 21/2387* (2013.01); *H04N 21/2393* (2013.01); *H04N 21/242* (2013.01); *H04N 21/47217* (2013.01)

(58) Field of Classification Search
None
See application file for complete search history.

(56) References Cited

U.S. PATENT DOCUMENTS 6,329,986 B1 * 12/2001 Cheng .................... G06F 3/011
715/706
7,203,648 B1 * 4/2007 Ostermann ............ G10L 21/10
704/275
(Continued)

FOREIGN PATENT DOCUMENTS

JP 2012-253716 A 12/2012
JP 2017-021799 A 1/2017
(Continued)

OTHER PUBLICATIONS

Japanese Office Action issued Dec. 7, 2021 in Japanese Application No. 2020-162381.
(Continued)

*Primary Examiner* — An Son P Huynh
(74) *Attorney, Agent, or Firm* — XSENSUS LLP

(57) ABSTRACT

A terminal apparatus of a distributor includes processing circuitry configured to transmit, to a first terminal apparatus of a viewer via a first server apparatus, one of either configuration data or a first video, the configuration data including audio data and motion data; after the transceiver receives a second video from a second server apparatus, control playback of the second video; and transmit playback data to the first terminal apparatus via the first server apparatus, the playback data including at least one of access data and indication data, the access data indicating a method for accessing the second video played back by the terminal apparatus, and the indication data indicating an operation to be performed on the second video by the first terminal apparatus in synchronization with playback of the second video by the terminal apparatus.

20 Claims, 20 Drawing Sheets

(51) Int. Cl.
*H04N 21/242* (2011.01)
*H04N 21/472* (2011.01)

(56) References Cited

U.S. PATENT DOCUMENTS

| | | | | |
|---|---|---|---|---|
| 7,386,799 B1* | 6/2008 | Clanton | | A63F 13/12 |
| | | | | 715/861 |
| 8,655,953 B2* | 2/2014 | Kandekar | | H04N 7/17318 |
| | | | | 709/200 |
| 9,104,908 B1* | 8/2015 | Rogers | | G06V 40/176 |
| 9,111,134 B1* | 8/2015 | Rogers | | G06V 10/7557 |
| 9,137,558 B2* | 9/2015 | Gibbon | | H04H 60/43 |
| 10,187,690 B1* | 1/2019 | Garcia | | H04N 21/44226 |
| 10,230,996 B1* | 3/2019 | Abreu | | H04N 21/4884 |
| 10,360,716 B1* | 7/2019 | van der Meulen | | G10L 25/57 |
| 10,419,790 B2* | 9/2019 | Gersten | | H04N 21/454 |
| 10,778,742 B2* | 9/2020 | Goswami | | H04N 21/6587 |
| 10,863,267 B2* | 12/2020 | Silva | | H04R 3/00 |
| 11,082,467 B1* | 8/2021 | Hartnett | | H04N 21/437 |
| 11,206,462 B2* | 12/2021 | Strickland | | H04N 21/23418 |
| 2002/0067909 A1* | 6/2002 | Iivonen | | H04N 21/4782 |
| | | | | 348/E7.063 |
| 2005/0210145 A1* | 9/2005 | Kim | | H04N 21/4788 |
| | | | | 709/219 |
| 2006/0161950 A1* | 7/2006 | Imai | | H04N 21/84 |
| | | | | 725/35 |
| 2006/0290699 A1* | 12/2006 | Dimtrva | | H04N 21/4341 |
| | | | | 345/473 |
| 2007/0157281 A1* | 7/2007 | Ellis | | H04N 21/4147 |
| | | | | 725/74 |
| 2007/0186243 A1* | 8/2007 | Pettit | | H04N 21/4622 |
| | | | | 348/E7.071 |
| 2008/0145032 A1* | 6/2008 | Lindroos | | H04N 21/4341 |
| | | | | 386/338 |
| 2008/0229215 A1* | 9/2008 | Baron | | G06N 3/006 |
| | | | | 715/751 |
| 2009/0089840 A1* | 4/2009 | Shusman | | H04N 21/854 |
| | | | | 725/51 |
| 2009/0249223 A1* | 10/2009 | Barsook | | H04N 7/15 |
| | | | | 715/753 |
| 2009/0259937 A1* | 10/2009 | Rohall | | G06Q 10/10 |
| | | | | 709/204 |
| 2010/0017474 A1* | 1/2010 | Kandekar | | H04N 21/4312 |
| | | | | 709/205 |
| 2010/0060647 A1* | 3/2010 | Brown | | G06T 13/40 |
| | | | | 345/473 |
| 2010/0306671 A1* | 12/2010 | Mattingly | | H04L 9/40 |
| | | | | 715/834 |
| 2011/0004481 A1* | 1/2011 | Jones | | G06F 3/011 |
| | | | | 705/1.1 |
| 2011/0078717 A1* | 3/2011 | Drummond | | H04N 21/4821 |
| | | | | 715/764 |
| 2011/0249074 A1* | 10/2011 | Cranfill | | H04N 23/90 |
| | | | | 348/E7.083 |
| 2013/0063668 A1 | 3/2013 | Yamashita et al. | | |
| 2013/0091205 A1* | 4/2013 | Kotler | | H04L 67/54 |
| | | | | 709/204 |
| 2014/0007147 A1* | 1/2014 | Anderson | | H04N 21/6582 |
| | | | | 725/9 |
| 2014/0068692 A1* | 3/2014 | Archibong | | H04N 21/6334 |
| | | | | 725/116 |
| 2014/0081954 A1* | 3/2014 | Elizarov | | H04N 21/4788 |
| | | | | 707/722 |
| 2014/0172425 A1* | 6/2014 | Ostermann | | G10L 21/10 |
| | | | | 704/235 |
| 2015/0110471 A1* | 4/2015 | Zheng | | G06F 3/005 |
| | | | | 386/291 |
| 2016/0006981 A1* | 1/2016 | Bauman | | H04N 21/4788 |
| | | | | 348/14.03 |
| 2016/0037217 A1* | 2/2016 | Harmon | | H04N 21/4542 |
| | | | | 725/9 |
| 2016/0366203 A1* | 12/2016 | Blong | | H04L 65/612 |
| 2016/0366464 A1* | 12/2016 | Rouady | | H04N 21/4312 |
| 2017/0006322 A1* | 1/2017 | Dury | | H04N 21/254 |
| 2017/0346926 A1* | 11/2017 | Charters | | G06F 9/453 |
| 2018/0095636 A1* | 4/2018 | Valdivia | | G06F 3/0482 |
| 2018/0147728 A1* | 5/2018 | Vyas | | B25J 11/0015 |
| 2018/0192000 A1* | 7/2018 | Mercredi | | G06Q 50/01 |
| 2019/0147225 A1* | 5/2019 | Thodberg | | G06V 40/171 |
| | | | | 382/226 |
| 2019/0320219 A1* | 10/2019 | Yoden | | H04N 21/47217 |
| 2019/0362312 A1* | 11/2019 | Platt | | H04L 65/1069 |
| 2020/0376382 A1* | 12/2020 | Hiromatsu | | A63F 13/63 |
| 2021/0014591 A1* | 1/2021 | Kim | | H04R 1/028 |
| 2021/0174544 A1* | 6/2021 | Kawakami | | G06F 3/0484 |
| 2021/0329381 A1* | 10/2021 | Holman | | G10L 21/0216 |
| 2021/0342433 A1† | 11/2021 | Fujita | | |
| 2021/0385510 A1* | 12/2021 | He | | H04N 21/2387 |
| 2022/0116270 A1† | 4/2022 | Matsumura | | |
| 2022/0233956 A1* | 7/2022 | Fukushige | | A63F 13/525 |
| 2022/0323862 A1* | 10/2022 | Baba | | G06F 3/04817 |

FOREIGN PATENT DOCUMENTS

| | | |
|---|---|---|
| JP | 2018-121329 A | 8/2018 |
| JP | 2019-204244 A | 11/2019 |
| JP | 2020-39029 A | 3/2020 |
| JP | 6691631 B1 | 4/2020 |

OTHER PUBLICATIONS

Office Action issued on May 9, 2023, in corresponding Japanese patent Application No. 2022-015923, 4 pages.
Japan Patent Office Notice of Reasons for Refusal mailed Nov. 5, 2024 in related Japanese Patent Application No. JP2023-178847 (8 pages; with English machine translation).

* cited by examiner
† cited by third party

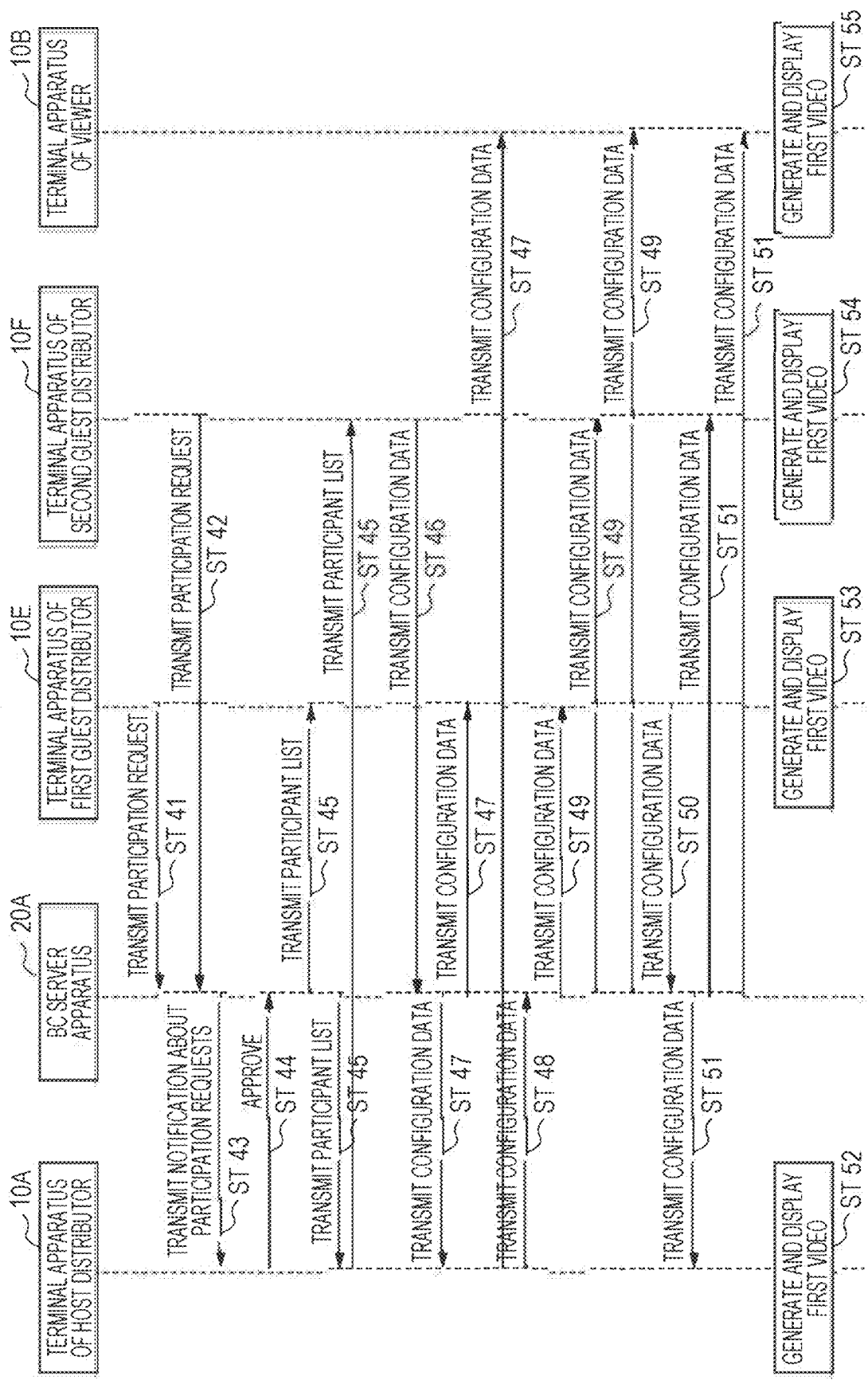

COMPUTER PROGRAM, METHOD, AND SERVER APPARATUS

CROSS-REFERENCE TO RELATED APPLICATIONS

The present application claims the benefit of priority to Japanese Application No. 2020-162381, filed in Japan on Sep. 28, 2020, the contents of which is hereby incorporated by reference in its entirety.

TECHNICAL FIELD

The technique disclosed in the present application relates to computer programs, methods, and server apparatuses used for transmitting videos containing animations of avatars of distributors to terminal apparatuses of viewers.

BACKGROUND

Conventionally, there are techniques for transmitting a video containing an animation of an avatar of a distributor to terminal apparatuses of viewers. In such techniques, the video containing the animation of the avatar of the distributor is generated based on motion data of the distributor (i.e., performer) and is distributed to the terminal apparatus of each viewer from a server apparatus.

SUMMARY

In an exemplary implementation of the present application, a terminal apparatus of a distributor, includes a transceiver and processing circuitry. The processing circuitry is configured to control the transceiver to transmit, to a first terminal apparatus of a viewer via a first server apparatus, one of either configuration data or a first video, wherein to transmit the first video, the processing circuitry generates the first video based on the configuration data, in a case that the configuration data is transmitted to the first terminal apparatus, the configuration data is for generating the first video by the first terminal apparatus of the viewer, and the configuration data includes audio data and motion data. The processing circuitry is further configured to, after the transceiver receives a second video from a second server apparatus, control playback of the second video, wherein the second server apparatus is different from the first server apparatus and the second server apparatus distributing the second video to the terminal apparatus and to the first terminal apparatus of the viewer. The processing circuitry is further configured to control the transceiver to transmit playback data to the first terminal apparatus of the viewer via the first server apparatus, wherein the playback data includes at least one of access data and indication data, the access data indicating a method for accessing the second video stored in the second server apparatus and played back by the terminal apparatus, and the indication data indicating an operation to be performed on the second video by the first terminal apparatus of the viewer in synchronization with playback of the second video by the terminal apparatus.

BRIEF DESCRIPTION OF THE DRAWINGS

FIG. 15 is a flowchart illustrating an example of operation related to collaborative distribution performed in the video distribution system illustrated in FIG. 1;

DETAILED DESCRIPTION OF THE DRAWINGS

Figure 1:
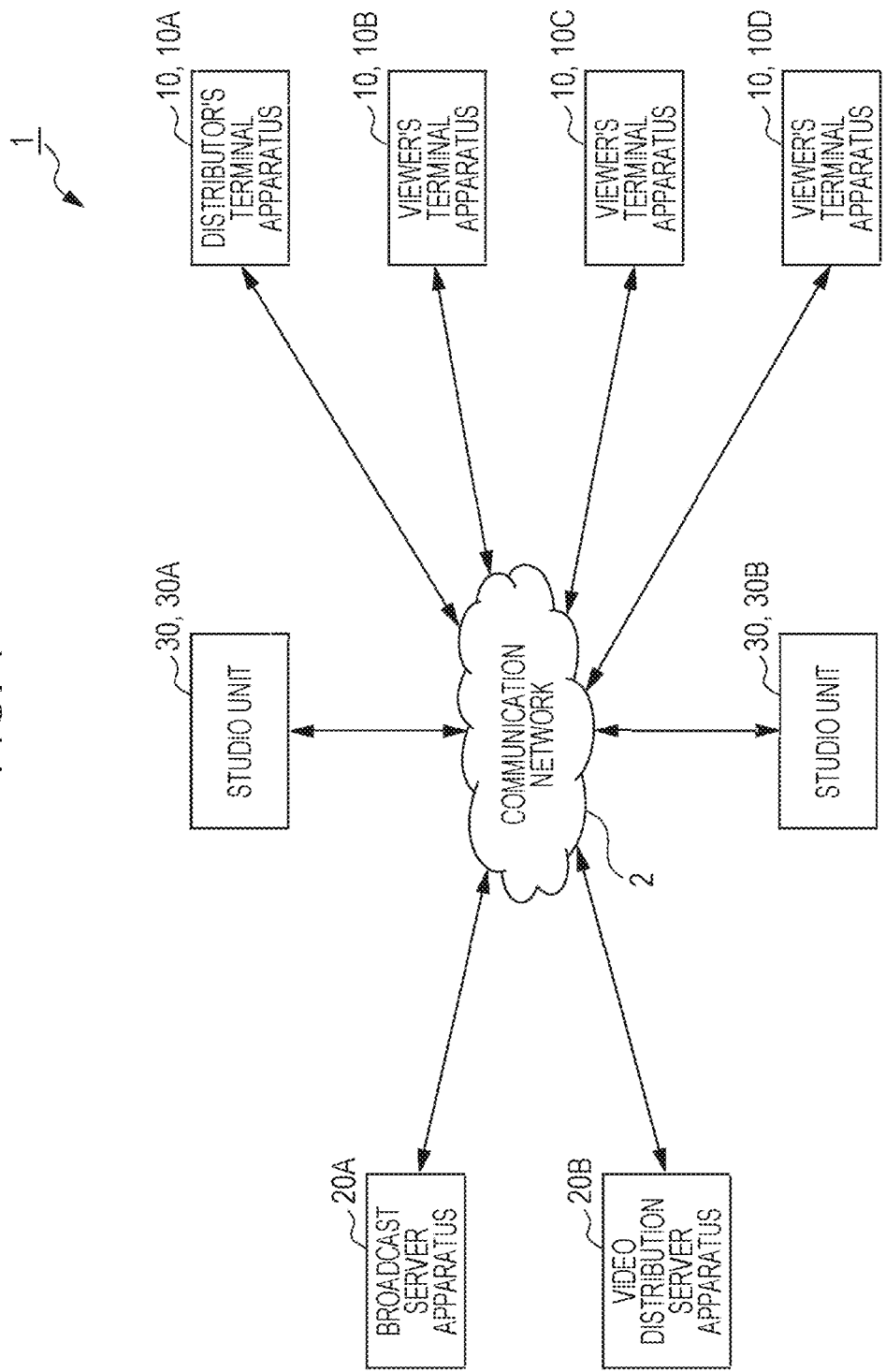
FIG. 1 is a block diagram illustrating an example of the configuration of a video distribution system according to an embodiment.

This specification is presented such that various representative embodiments are not intended to be limited in any way. A singular form used in the present application, such as "single", "the", "said", "aforementioned", "relevant", "this", or "that", may include a plural form, unless it is clearly stated that the singular form is not a plural form. Furthermore, the term "include" may include the meaning of "comprise" or "have". Moreover, the term "coupled with", "coupled to", "linked with", "linked to", "connected with", or "connected to" includes methods for mechanically, electrically, magnetically, and optically coupling, linking, or connecting target objects with each other together with other methods, and does not exclude the existence of an intermediate element disposed between these target objects that are coupled with, coupled to, linked with, linked to, connected with, or connected to each other.

The various systems, methods, and apparatuses to be described in this specification are not to be interpreted as being limited in any way. In actuality, the present disclosure is directed toward all new features and modes in each of the various disclosed embodiments, a combination of these various embodiments, and a partial combination of these various embodiments. The various systems, methods, and apparatuses to be described in this specification are not to be limited to a specific mode, a specific feature, or a combination of such a specific mode and such a specific feature, and an object and a method to be described in this specification do not demand that one or more specific advantages are to be achieved or that a problem is to be solved. Moreover, the various features, modes, or parts of such features or modes in the various embodiments described in this specification may be used by being combined with each other.

Although the processes in some of the various methods disclosed in this specification are described in a specific sequence for the sake of convenience, it should be noted that the description based on such a technique includes a change in the sequence of the processes, unless the specific sequence is demanded in specific writing provided below. For example, a plurality of processes described in a certain sequence may be rearranged in a difference sequence or may be executed simultaneously in some cases. Furthermore, for the purpose of simplification, the appended drawings do not indicate various methods by which the various items and methods described in this specification may be used together with other items and methods. In addition, in this specification, the terms "generate", "cause to occur", "display", "receive", "evaluate", and "distribute" are sometimes used. These terms are high-level terms of various actual processes to be executed. The various actual processes corresponding to these terms may change depending on a specific implementation, and are readily recognizable by a skilled person who is to benefit from the disclosure of this specification.

Operational theories, scientific principles, or other theoretical descriptions presented in this specification in relation to the apparatuses or the methods of the disclosure are provided for the purpose of a better understanding, and are not intended to limit the technical scope. The apparatuses and methods in the appended claims are not limited to apparatuses and methods operating in accordance with methods described in such operational theories.

The various methods disclosed in this specification are all implemented by using a plurality of computer-executable commands stored in one or more computer-readable media (e.g., one or more non-transitory computer-readable storage media, such as one or more optical medium disks, a plurality of volatile memory components, or a plurality of nonvolatile memory components), and may all be executed by a computer. The aforementioned plurality of volatile memory components include, for example, a DRAM or an SRAM. Furthermore, the aforementioned plurality of nonvolatile memory components include, for example, a hard drive and a solid state drive (SSD). Moreover, the aforementioned computer includes, for example, any commercially-available computer including a smartphone and other mobile apparatuses having hardware that performs computing.

The plurality of computer-executable commands for implementing the technique disclosed in this specification may all be stored in one or more computer-readable media (e.g., non-transitory computer-readable storage media) together with any data to be generated and used during the implementation of the various embodiments disclosed in this specification. For example, such a plurality of computer-executable commands may be a part of an individual software program, or may be a part of a software application accessed or downloaded via a web browser or another software application (such as a remote computing application). For example, such software may be executed in a single local computer (serving as, for example, an agent to be executed in any suitable commercially-available computer) or in a network environment (e.g., the Internet, a wide area network, a local area network, a client server network (such as a cloud computing network), or another similar network) by using one or more network computers.

For clarification, only various specifically-selected modes among various software-based implementations will be described. Other detailed items that are commonly known in the relevant field will be omitted. For example, the technique disclosed in this specification is not limited to a specific computer language or program. For example, the technique disclosed in this specification may be executed by software written in C, C++, Java, or any other suitable programming language. Likewise, the technique disclosed in this specification is not limited to a specific computer or a specific type of hardware. Specific detailed items of suitable computers and hardware are commonly known and do not have to be described in detail in this specification.

Furthermore, the various software-based embodiments (including, for example, the plurality of computer-executable commands for causing the computer to execute any of the various methods disclosed in this specification) may all be uploaded, downloaded, or remotely accessed by suitable communication means. Such suitable communication means includes, for example, the Internet, the World Wide Web, an intranet, a software application, a cable (including an optical fiber cable), magnetic communication, electromagnetic communication (including RF communication, microwave communication, and infrared communication), electronic communication, or another similar communication means.

There is a demand for a service in which the distributor and the viewer can together enjoy viewing a video prepared separately from the aforementioned video. The inventors of the present application have developed technologies disclosed in this application to address this demand. In particular, the technologies disclosed in the present application provides a computer program, a method, and a server apparatus in which a distributor and a viewer can together view a video prepared separately from a video containing an animation of an avatar of the distributor.

A computer program according to an aspect is executed by at least one processor equipped in a terminal apparatus of a distributor. The computer program causes the at least one processor to execute a function including: transmitting configuration data or a first video generated based on the configuration data to a terminal apparatus of a viewer via a first server apparatus, the configuration data being used for generating the first video by the terminal apparatus of the viewer and at least including audio data and motion data; receiving a second video from a second server apparatus different from the first server apparatus and playing back the second video, the second server apparatus distributing the second video to the terminal apparatus of the distributor and the terminal apparatus of the viewer; and transmitting playback data to the terminal apparatus of the viewer via the first server apparatus, the playback data including at least one of access data and indication data, the access data indicating a method for accessing the second video stored in the second server apparatus and played back by the terminal apparatus of the distributor, the indication data indicating operation to be performed on the second video by the terminal apparatus of the viewer in synchronization with the playback of the second video by the terminal apparatus of the distributor.

A method according to an aspect is executed by at least one processor equipped in a terminal apparatus of a distributor. The at least one processor executes a computer-readable command. The method includes: causing the at least one processor to execute the command; transmitting configuration data or a first video generated based on the configuration data to a terminal apparatus of a viewer via a first server apparatus, the configuration data being used for generating the first video by the terminal apparatus of the viewer and at least including audio data and motion data; receiving a second video from a second server apparatus different from the first server apparatus and playing back the second video, the second server apparatus distributing the second video to the terminal apparatus of the distributor and the terminal apparatus of the viewer; and transmitting playback data to the terminal apparatus of the viewer via the first server apparatus, the playback data including at least one of access data and indication data, the access data indicating a method for accessing the second video stored in the second server apparatus and played back by the terminal apparatus of the distributor, the indication data indicating operation to be performed on the second video by the terminal apparatus of the viewer in synchronization with the playback of the second video by the terminal apparatus of the distributor.

A computer program according to another aspect is executed by at least one processor equipped in a terminal apparatus of a viewer. The computer program causes the at least one processor to execute a function including: receiving configuration data or a first video generated based on the configuration data from a terminal apparatus of a distributor via a first server apparatus, the configuration data at least including audio data and motion data; generating the first video by using the configuration data and playing back the first video, or playing back the received first video; receiving a second video from a second server apparatus different from the first server apparatus, the second server apparatus distributing the second video to the terminal apparatus of the distributor and the terminal apparatus of the viewer; receiving playback data via the first server apparatus, the playback data including at least one of access data and indication data, the access data indicating a method for accessing the second video stored in the second server apparatus and played back by the terminal apparatus of the distributor, the indication data indicating operation to be performed on the second video by the terminal apparatus of the viewer in synchronization with the playback of the second video by the terminal apparatus of the distributor; and playing back the second video in accordance with the playback data.

A method according to another aspect is executed by at least one processor equipped in a terminal apparatus of a viewer. The at least one processor executes a computer-readable command. The method includes: causing the at least one processor to execute the command; receiving configuration data or a first video generated based on the configuration data from a terminal apparatus of a distributor via a first server apparatus, the configuration data at least including audio data and motion data; generating the first video by using the configuration data and playing back the first video, or playing back the received first video; receiving a second video from a second server apparatus different from the first server apparatus, the second server apparatus distributing the second video to the terminal apparatus of the distributor and the terminal apparatus of the viewer; receiving playback data via the first server apparatus, the playback data including at least one of access data and indication data, the access data indicating a method for accessing the second video stored in the second server apparatus and played back by the terminal apparatus of the distributor, the indication data indicating operation to be performed on the second video by the terminal apparatus of the viewer in synchronization with the playback of the second video by the terminal apparatus of the distributor; and playing back the second video in accordance with the playback data.

A server apparatus according to an aspect includes at least one processor and provided separately from a second server apparatus that distributes a second video to a terminal apparatus of a distributor and a terminal apparatus of a viewer. The at least one processor receives configuration data from the terminal apparatus of the distributor and transmits the configuration data to the terminal apparatus of the viewer, or distributes a first video generated based on the configuration data to the terminal apparatus of the viewer. The configuration data is used for generating the first video by the terminal apparatus of the viewer and at least includes audio data and motion data. The at least one processor receives playback data from the terminal apparatus of the distributor and transmits the playback data to the terminal apparatus of the viewer. The playback data includes at least one of access data and indication data. The access data indicates a method for accessing the second video stored in the second server apparatus and played back by the terminal apparatus of the distributor. The indication data indicates operation to be performed on the second video by the terminal apparatus of the viewer in synchronization with the playback of the second video by the terminal apparatus of the distributor.

A method according to yet another aspect is executed by at least one processor equipped in a server apparatus provided separately from a second server apparatus that distributes a second video to a terminal apparatus of a distributor and a terminal apparatus of a viewer. The at least one processor executes a computer-readable command. The method includes: causing the at least one processor to execute the command; receiving configuration data from the terminal apparatus of the distributor and transmitting the configuration data to the terminal apparatus of the viewer, or transmitting a first video generated based on the configuration data to the terminal apparatus of the viewer, the configuration data being used for generating the first video by the terminal apparatus of the viewer and at least including audio data and motion data; receiving playback data from the terminal apparatus of the distributor and transmitting the playback data to the terminal apparatus of the viewer, the playback data including at least one of access data and indication data, the access data indicating a method for accessing the second video stored in the second server apparatus and played back by the terminal apparatus of the distributor, the indication data indicating operation to be performed on the second video by the terminal apparatus of the viewer in synchronization with the playback of the second video by the terminal apparatus of the distributor.

Various embodiments of the present disclosure will be described below with reference to the appended drawings. In the drawings, identical elements are given the same reference signs. It should be noted that an element expressed in a certain drawing may sometimes be omitted in another drawing for the sake of convenience. It should also be noted that the appended drawings are not necessarily indicated with an accurate scale.

1. Configuration of Video Distribution System

Briefly speaking, in a video distribution system disclosed in the present application, a distributor can use his/her terminal apparatus to distribute configuration data containing audio data related to sound released by the distributor and motion data related to motion of the distributor to a terminal apparatus of each viewer via a first server apparatus (e.g., a broadcast server apparatus). Accordingly, the terminal apparatus of each viewer can generate a first video by using the received configuration data and display the first video. The first video may be a video containing an animation of an avatar of the distributor that is synchronous with the distributor's performance.

In place of the configuration data, the terminal apparatus of the distributor can transmit a first video generated based on the configuration data to the terminal apparatus of each viewer via the first server apparatus. Accordingly, the terminal apparatus of each viewer can display the received first video.

Furthermore, the terminal apparatus of the distributor and the terminal apparatus of each viewer can receive and display a second video directly from a second server apparatus (e.g., a video distribution server apparatus) without the intervention of the first server apparatus. The second video may be a video selected by the terminal apparatus of the distributor from a plurality of videos preliminarily stored in the second server apparatus. Accordingly, the terminal apparatus of the distributor and the terminal apparatus of each viewer can both receive and display the same second video.

In particular, the terminal apparatus of the distributor can transmit playback data (i.e., playback information) to the terminal apparatus of each viewer via the first server apparatus. The playback data may contain access data (i.e., access information) (URL) indicating a method for accessing the second video stored in the second server apparatus and played back by the terminal apparatus of the distributor and/or indication data (i.e., indication information) indicating operation to be performed on the second video by the terminal apparatus of each viewer. The terminal apparatus of each viewer can play back the second video received from the second server apparatus in accordance with the playback data received from the first server apparatus. Accordingly, the terminal apparatus of each viewer can play back the second video at a timing synchronous with the playback of the second video by the terminal apparatus of the distributor.

FIG. 1 is a block diagram illustrating an example of the configuration of a video distribution system according to an embodiment. As illustrated in FIG. 1, a video distribution system 1 may include a plurality of terminal apparatuses 10 connectable to a communication line (i.e., a communication network) 2 and a plurality of server apparatuses 20 connectable to the communication line 2. The terminal apparatuses 10 are connectable to the plurality of server apparatuses 20 via the communication line 2.

Although terminal apparatuses 10A to 10D are illustrated as an example of the plurality of terminal apparatuses 10 in FIG. 1, one or more terminal apparatuses 10 other than the terminal apparatuses 10A to 10D may similarly be used. Likewise, although a first server apparatus 20A and a second server apparatus 20B are illustrated as an example of the plurality of server apparatuses 20 in FIG. 1, one or more server apparatuses 20 other than the server apparatuses 20A and 20B may similarly be used. The communication line 2 may include, but is not limited to, a mobile phone network, a wireless network (e.g., a radio frequency (RF) connection via Bluetooth, WiFi (such as IEEE 802.11a/b/n), WiMAX, cellular, satellite, laser, or infrared radiation), a landline phone network, the Internet, an intranet, a local area network (LAN), a wide area network (WAN), and/or an Ethernet network.

Furthermore, in one embodiment, the video distribution system 1 may include one or more studio units 30 connected to the communication line 2. Each studio unit 30 is connectable to the plurality of server apparatuses 20 or the plurality of terminal apparatuses 10 via the communication line 2. Although a studio unit 30A and a studio unit 30B are illustrated as an example of one or more studio units 30 in FIG. 1, one or more studio units 30 other than the studio units 30A and 30B may similarly be used. The studio units 30 may have a function similar to that of the terminal apparatuses 10 or the server apparatuses 20 to be described below.

1.1. Terminal Apparatus 10

The plurality of terminal apparatuses 10 may include at least one terminal apparatus 10 of a distributor (in this case, the terminal apparatus 10A) and one or more terminal apparatuses 10 of viewers (in this case, the terminal apparatuses 10B to 10D). The terminal apparatuses 10 have identical configurations and may each serve as either one of a terminal apparatus (i.e., a distributor's terminal apparatus 10) for distributing a video and a terminal apparatus (i.e., a viewer's terminal apparatus 10) for viewing the video.

When operating as a terminal apparatus (i.e., a distributor's terminal apparatus) for distributing a first video, each terminal apparatus 10 can execute an installed video distribution application (which may be middleware or a combination of an application and middleware; the same applies hereinafter). Accordingly, the terminal apparatus 10 acquires motion data related to motion of the distributor and audio data related to sound released by the distributor, and can transmit configuration data at least containing the motion data and the audio data to the first server apparatus 20A via the communication line 2. Alternatively, the terminal apparatus 10 can transmit a first video generated based on the configuration data to the first server apparatus 20A via the communication line 2.

The first server apparatus 20A distributes the configuration data or the first video to the terminal apparatus 10 of each viewer via the communication line 2. The terminal apparatus 10 of each viewer can execute an installed video viewing application (which may be middleware or a combination of an application and middleware; the same applies hereinafter) to receive the configuration data or the first video.

When operating as a terminal apparatus (i.e., a viewer's terminal apparatus) for viewing the first video, each terminal apparatus 10 can execute the installed video viewing application to receive the configuration data or the first video distributed by the terminal apparatus 10 of the distributor via the first server apparatus 20A. In this case, when the terminal apparatus 10 executing the video viewing application receives the configuration data, the terminal apparatus 10 can generate the first video by using the configuration data and display the first video. In contrast, when the terminal apparatus 10 executing the video viewing application receives the first video, the terminal apparatus 10 can display the first video.

On the other hand, when operating as a distributor's terminal apparatus or as a viewer's terminal apparatus, each terminal apparatus 10 can execute an installed video reception application (which may be middleware or a combination of an application and middleware; the same applies hereinafter). The terminal apparatus 10 can execute this video reception application to directly access the second server apparatus 20B, receive a second video therefrom, and display (play back) the second video without the intervention of the first server apparatus 20A.

The video distribution application for distributing the first video and the video viewing application for viewing the first video may be installed in and executed by each terminal apparatus 10 as a single integrated application or as separate applications.

The video reception application for receiving the second video from the second server apparatus 20B may be installed in and executed by each terminal apparatus 10 as an application independent of the video distribution application for distributing the first video and the video viewing application for viewing the first video. In one embodiment, the video reception application for receiving the second video from the second server apparatus 20B may be an embedded player.

Each terminal apparatus 10 may be any terminal apparatus that can execute such operation, and may include, but is not limited to, a smartphone, a tablet, a mobile phone (i.e., a feature phone), and/or a personal computer.

1.2. Server Apparatus 20

In FIG. 1, the first server apparatus 20A and the second server apparatus 20B are illustrated as an example of the plurality of server apparatuses 20. For example, the first server apparatus 20A is a "broadcast server apparatus", and the second server apparatus 20B is a "video distribution server apparatus". The names "broadcast server apparatus" and "video distribution server apparatus" are merely exemplary names and may be any names.

The broadcast server apparatus (referred to as "BC server apparatus" hereinafter) 20A can receive configuration data or a first video from the terminal apparatus 10 of the distributor and distribute the configuration data or the first video to the terminal apparatus 10 of each viewer. Moreover, the BC server apparatus 20A can receive playback data (containing access data and/or indication data) from the terminal apparatus 10 of the distributor and distribute the playback data to the terminal apparatus 10 of each viewer.

The video distribution server apparatus 20B can store a plurality of videos therein in advance. The video distribution server apparatus 20B can distribute any one of the plurality of videos as a second video to the distributor's terminal apparatus 10 and each viewer's terminal apparatus 10 that have accessed the video distribution server apparatus 20B.

1.3. Studio Unit 30

Each studio unit 30 may be disposed in, for example, a studio, a room, or a hall serving as a location from which the distributor (i.e., performer) distributes a video. As mentioned above, the studio units 30 can function similarly to the terminal apparatuses 10 and/or the server apparatuses 20.

2. Hardware Configuration of Each Apparatus

The following description relates to an example of the hardware configuration that each of the terminal apparatuses 10 and the server apparatuses 20 has.

2.1. Hardware Configuration of Terminal Apparatus 10

Figure 2:
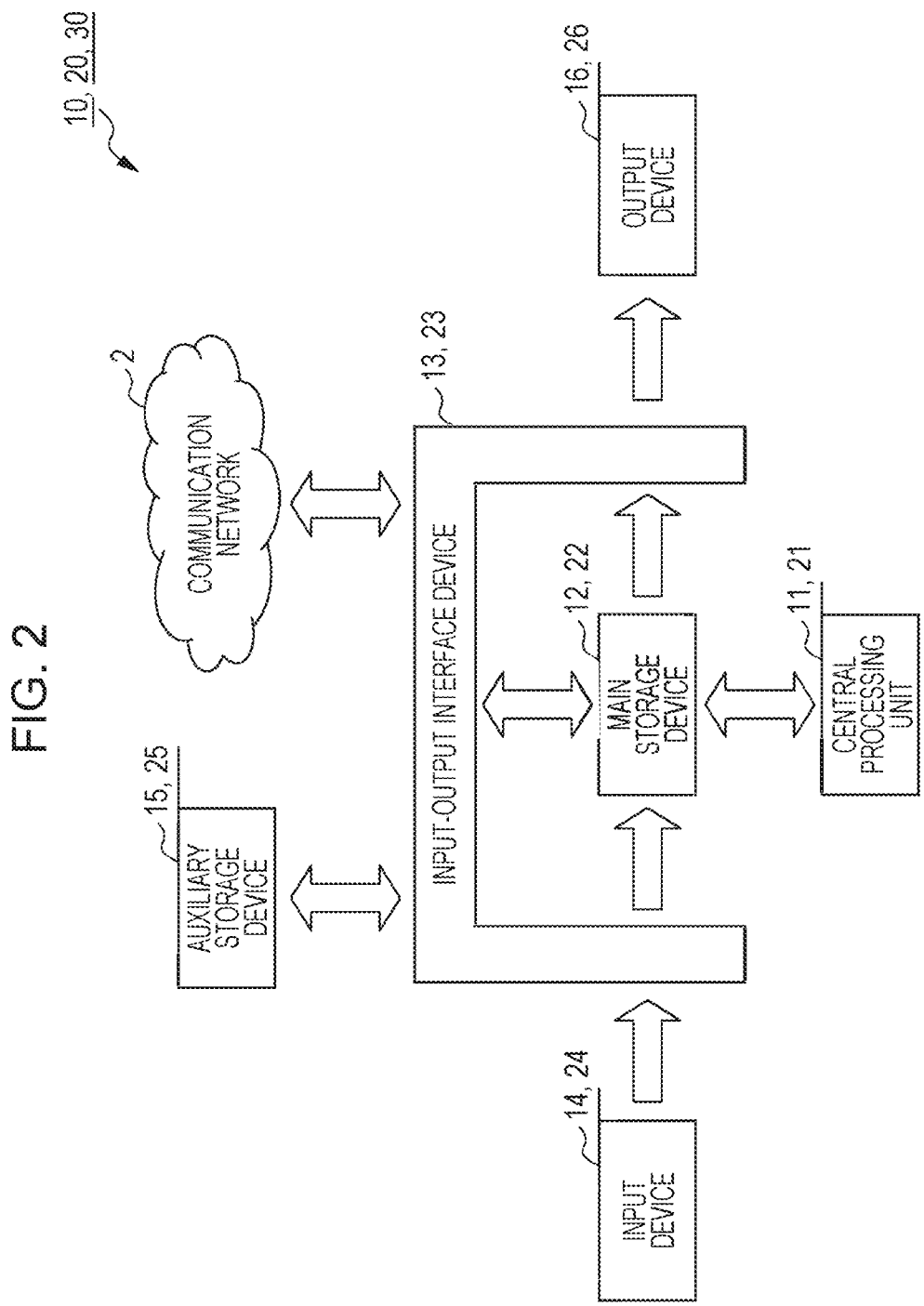
FIG. 2 is a block diagram schematically illustrating an example of the hardware configuration of each terminal apparatus (server apparatus) illustrated in FIG. 1.

A hardware configuration example of each terminal apparatus 10 will now be described with reference to FIG. 2. FIG. 2 is a block diagram schematically illustrating an example of the hardware configuration of each terminal apparatus 10 (server apparatus 20) illustrated in FIG. 1. FIG. 2 includes each reference sign indicated in relation to a server apparatus 20 to be described later.

As illustrated in FIG. 2, each terminal apparatus 10 may mainly include a central processing unit 11, a main storage device 12, an input-output interface device 13, an input device 14, an auxiliary storage device 15, and an output device 16. These devices are connected to each other by a data bus and/or a control bus.

The central processing unit 11 is known as a "CPU", and can perform a computing process on commands and data stored in the main storage device 12 and store the computing result in the main storage device 12. Moreover, the central processing unit 11 can control, for example, the input device 14, the auxiliary storage device 15, and the output device 16 via the input-output interface device 13. The terminal apparatus 10 may include one or more of such central processing units 11.

The main storage device 12 is known as a "memory", and can store therein commands and data received from the input device 14, the auxiliary storage device 15, and the communication line 2 (such as a server apparatus 20) via the input-output interface device 13, as well as the computing result of the central processing unit 11. The main storage device 12 may include, but is not limited to, a computer-readable medium, such as a volatile memory (e.g., a register, a cache, or a random access memory (RAM)), a nonvolatile memory (e.g., a read-only memory (ROM), an EEPROM, or a flash memory), and a storage unit (e.g., a hard disk drive (HDD), a solid state drive (SSD), a magnetic tape, or an optical medium). For an easier understanding, the term "computer-readable storage medium" may include a medium for data storage, such as a memory or a storage unit, instead of a transmission medium for a modulated data signal, that is, a transitory signal.

The auxiliary storage device 15 has a larger capacity than the main storage device 12, and can store commands and data (i.e., computer programs) that constitute the aforementioned specific applications (such as the video distribution application, the video viewing application, and the video reception application) and a web browser application. Furthermore, by being controlled by the central processing unit 11, the auxiliary storage device 15 can transmit these commands and data (i.e., computer programs) to the main storage device 12 via the input-output interface device 13. The auxiliary storage device 15 may include, but is not limited to, a magnetic disk device and/or an optical disk device.

The input device 14 loads data from the outside and may include, but is not limited to, a touchscreen, a button, a keyboard, a mouse, and/or a sensor. As will be described later, the sensor may include, but is not limited to, a sensor including one or more cameras and/or one or more microphones.

The output device 16 may include, but is not limited to, a display device, a touchscreen, and/or a printer device.

In such a hardware configuration, the central processing unit 11 can sequentially load the commands and data (i.e., computer programs) that constitute the specific applications stored in the auxiliary storage device 15 to the main storage device 12 and perform a computing process on the loaded commands and data. Accordingly, the central processing unit 11 can control the output device 16 via the input-output interface device 13 or exchange various data with another apparatus (e.g., a server apparatus 20 and/or another terminal apparatus 10) via the input-output interface device 13 and the communication line 2.

Accordingly, by executing an installed specific application, the terminal apparatus 10 can execute, for example, at least one of processes exemplified below (including various processes to be described in detail later):

a. an appropriate process involving generating configuration data or a first video and transmitting the configuration data or the first video to the terminal apparatus 10 of each viewer via the BC server apparatus 20A;

b. an appropriate process involving accessing the video distribution server apparatus 20B and receiving a second video from the video distribution server apparatus 20B;

c. an appropriate process involving, when a second video is being played back, transmitting playback data to the terminal apparatus 10 of each viewer via the BC server apparatus 20A;

d. an appropriate process involving receiving configuration data or a first video distributed by another terminal apparatus 10;

e. an appropriate process involving generating a first video by using configuration data received from another terminal apparatus 10 and displaying the first video;

f. an appropriate process involving displaying a first video received from another terminal apparatus 10; and g. an appropriate process involving displaying (playing back) a second video received from the video distribution server apparatus 20B in accordance with playback data received from the BC server apparatus 20A.

In place of the central processing unit 11 or in addition to the central processing unit 11, the terminal apparatus 10 may include one or more microprocessors and/or a graphics processing unit (GPU). In an exemplary implementation, central processing unit 11 may correspond to or include processing circuitry 600, which will be discussed later with respect to FIG. 19.

2.2. Hardware Configuration of Server Apparatus 20

A hardware configuration example of each server apparatus 20 will similarly be described with reference to FIG. 2. For example, the hardware configuration of each of the server apparatuses 20 (i.e., the BC server apparatus 20A and the video distribution server apparatus 20B) may be the same as the hardware configuration of each terminal apparatus 10 described above. Therefore, the reference signs given to the components included in each server apparatus 20 are indicated in FIG. 2.

As illustrated in FIG. 2, each server apparatus 20 may mainly include a central processing unit 21, a main storage device 22, an input-output interface device 23, an input device 24, an auxiliary storage device 25, and an output device 26. These devices are connected to each other by a data bus and/or a control bus.

The central processing unit 21, the main storage device 22, the input-output interface device 23, the input device 24, the auxiliary storage device 25, and the output device 26 are substantially identical to the central processing unit 11, the main storage device 12, the input-output interface device 13, the input device 14, the auxiliary storage device 15, and the output device 16, respectively, included in each terminal apparatus 10 described above.

In such a hardware configuration, the central processing unit 21 can sequentially load commands and data (i.e., computer programs) that constitute specific applications and that are stored in the auxiliary storage device 25 to the main storage device 22 and perform a computing process on the loaded commands and data. Accordingly, the central processing unit 21 can control the output device 26 via the input-output interface device 23 or exchange various data with another apparatus (e.g., each terminal apparatus 10) via the input-output interface device 23 and the communication line 2.

Accordingly, the BC server apparatus 20A can execute, for example, at least one of processes exemplified below (including various processes to be described in detail later):

a. an appropriate process involving distributing configuration data or a first video transmitted by the terminal apparatus 10 of each distributor to the terminal apparatus 10 of each viewer;

(b. an appropriate process involving generating a first video by using configuration data transmitted by the terminal apparatus 10 of each distributor and distributing the generated first video to the terminal apparatus 10 of each viewer;) and c. an appropriate process involving distributing playback data transmitted by the terminal apparatus 10 of each distributor to the terminal apparatus 10 of each viewer.

Likewise, the video distribution server apparatus 20B can execute, for example, at least one of processes exemplified below (including various processes to be described in detail later):

a. an appropriate process involving storing a plurality of videos; and b. an appropriate process involving distributing a video designated by each terminal apparatus 10 from among the plurality of stored videos to the terminal apparatus 10 as a second video.

In place of the central processing unit 21 or in addition to the central processing unit 21, the server apparatus 20 may include one or more microprocessors and/or a graphics processing unit (GPU). In an exemplary implementation, central processing unit 21 may correspond to or include processing circuitry 600, which will be discussed later with respect to FIG. 19.

2.3. Hardware Configuration of Studio Unit 30

As mentioned above, each studio unit 30 can function similarly to a terminal apparatus 10 and/or the BC server apparatus 20A. Therefore, each studio unit 30 can have a hardware configuration similar to that of each terminal apparatus 10 or the BC server apparatus 20A described above.

3.1. Function of Terminal Apparatus 10

Figure 3:
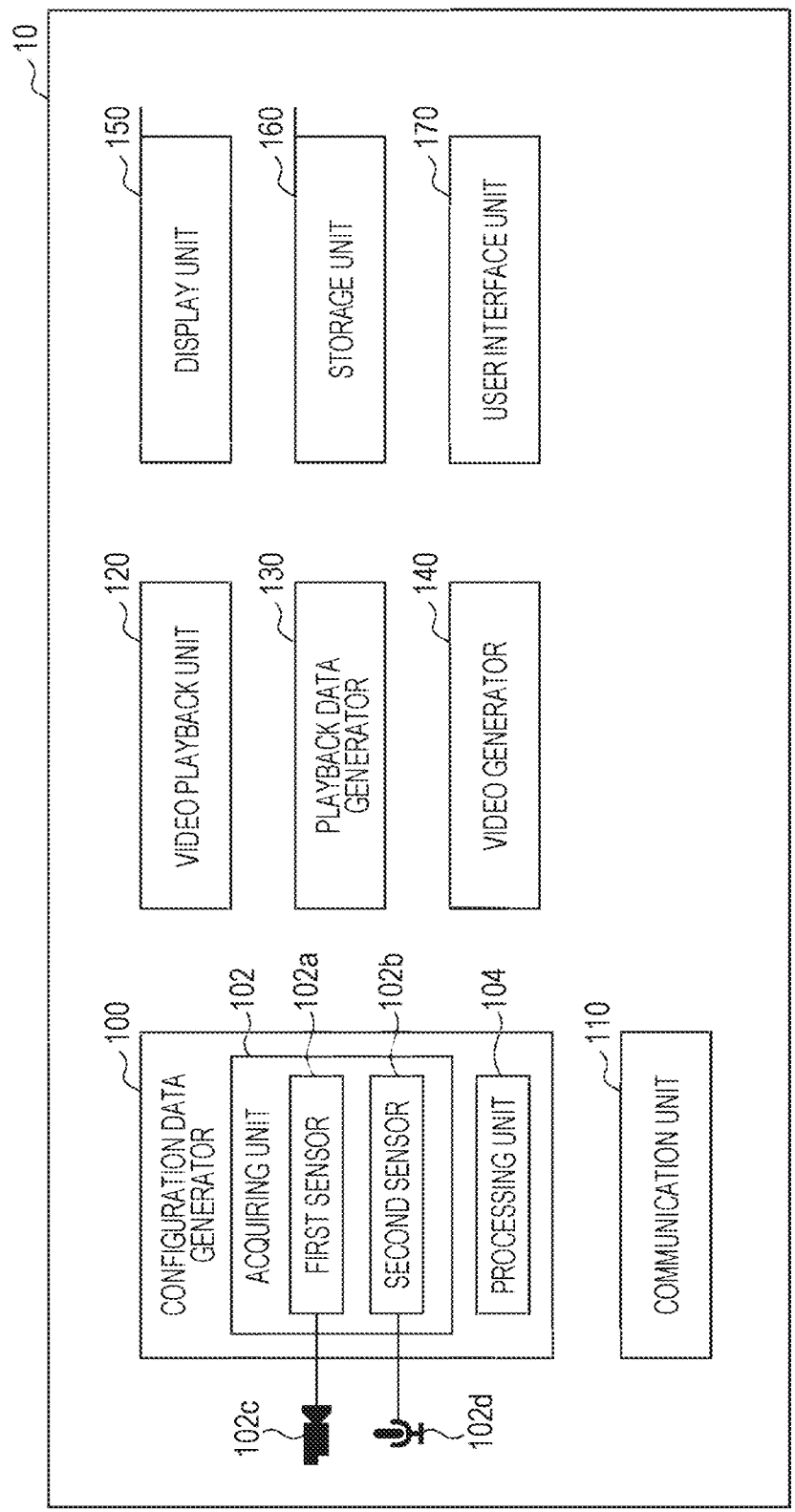
FIG. 3 is a block diagram schematically illustrating an example of the function of each terminal apparatus illustrated in FIG. 1.

An example of the function of each terminal apparatus 10 will now be described with reference to FIG. 3. FIG. 3 is a block diagram schematically illustrating an example of the function of each terminal apparatus 10 illustrated in FIG. 1.

As illustrated in FIG. 3, each terminal apparatus 10 may mainly include a configuration data generator 100, a communication unit 110, a video playback unit 120, a playback data generator 130, a video generator 140, a display unit 150, a storage unit 160, and a user interface unit 170.

(1) Configuration Data Generator 100

In a case where the relevant terminal apparatus 10 operates as a distributor's terminal apparatus 10, for example, the configuration data generator 100 can generate, at every unit time, configuration data at least containing motion data related to motion of the distributor and audio data related to sound released by the distributor. Motion data may be data obtained by recording a digital expression of the motion of, for example, the distributor's face in association with a time stamp. Audio data may be data obtained by recording a digital expression of the sound released by the distributor in association with a time stamp.

In order to generate such configuration data, the configuration data generator 100 may include, for example, an acquiring unit 102 and a processing unit 104.

The acquiring unit 102 may include at least one first sensor 102a (e.g., a camera 102c) that acquires data related to the body of the distributor and at least one second sensor 102b (e.g., a microphone 102d) that acquires audio data related to speech output by the distributor.

The first sensor 102a may include, for example, a radiating unit that radiates an infrared ray toward, for example, the distributor's face, and an infrared camera that detects the infrared ray reflected by, for example, the distributor's face. Alternatively, the first sensor 102a may include an RGB camera that captures an image of, for example, the distributor's face, and an image processor that processes the image captured by the camera.

For example, the second sensor 102b can detect the sound released by the distributor and output the sound as an audio signal.

The processing unit 104 can use data detected by the first sensor 102a to detect a change in the distributor's expression from a predetermined time point (e.g., an initial time point at which the detection is started), as well as a change in the relative position of the distributor. Accordingly, the processing unit 104 can generate motion data indicating a change in, for example, the distributor's face in association with a time stamp. For example, at every unit time identified in accordance with the time stamp, such motion data may contain, for example, data indicating which part of and how the distributor's face has changed, as well as data indicating how the relative position of the distributor has changed.

For example, the motion data may be acquired by using a motion capturing system. As it is readily understandable by a skilled person who is to benefit from this disclosure, several examples of appropriate motion capturing systems that may be used together with the apparatuses and methods disclosed in the present application include an optical motion capturing system that uses a passive marker or an active marker or that does not use a marker, and a non-optical system of an inertia type or a magnetic type. The motion data may be acquired by using an image capturing device (such as a charge-coupled device (CCD) or a complementary metal oxide semiconductor (CMOS) image sensor) coupled to a computer that converts motion data into a video or another image data.

Furthermore, the processing unit 104 can generate audio data by recording the audio signal detected by the second sensor 102b in association with a time stamp. For example, the processing unit 104 can generate this audio data as an audio file, such as an MPEG file.

Accordingly, the processing unit 104 can generate configuration data at least containing audio data and motion data.

Furthermore, the processing unit 104 can allow the configuration data to contain avatar data. Avatar data is three-dimensional model data for rendering an avatar of the distributor. The avatar data may contain, for example, data for rendering the avatar and texture data to be applied to the avatar. The data for rendering the avatar may contain, for example, polygon data and bone data for expressing the motion of the avatar. The texture data may contain a plurality of parts data (e.g., the eyes, eyebrows, nose, ears, and clothing) to be applied to the avatar.

(2) Communication Unit 110

The communication unit 110 can allow the BC server apparatus 20A and the video distribution server apparatus 20B to exchange various data to be used for distributing and/or viewing a video.

For example, in a case where the relevant terminal apparatus 10 operates as a distributor's terminal apparatus 10, the communication unit 110 can transmit or receive at least one piece of the following pieces of data.

Data Transmitted by Communication Unit 110
  a. Configuration data generated by the configuration data generator 100 (this configuration data may be distributed to the terminal apparatus 10 of each viewer via the BC server apparatus 20A)
  b. A first video generated by the video generator 140 based on configuration data generated by the configuration data generator 100 (this first video may be distributed to the terminal apparatus 10 of each viewer via the BC server apparatus 20A)
  c. Playback data (this playback data may be distributed to the terminal apparatus 10 of each viewer via the BC server apparatus 20A)

Data Received by Communication Unit 110
  a. A second video from the video distribution server apparatus 20B

On the other hand, for example, in a case where the relevant terminal apparatus 10 operates as a viewer's terminal apparatus 10, the communication unit 110 can transmit or receive at least one piece of the following pieces of data.

Data Transmitted by Communication Unit 110
  a. Access data (URL) contained in playback data received from the terminal apparatus 10 of the distributor (this access data may be transmitted to the video distribution server apparatus 20B)

Data Received by Communication Unit 110
  a. Configuration data (or a first video) and playback data transmitted by the terminal apparatus 10 of the distributor and received via the BC server apparatus 20A
  b. A second video from the video distribution server apparatus 20B

(3) Video Playback Unit 120

The video playback unit 120 plays back a second video transmitted by the video distribution server apparatus 20B and received by the communication unit 110.

In particular, in a case where the relevant terminal apparatus 10 operates as a viewer's terminal apparatus 10, the video playback unit 120 can play back the second video in accordance with playback data received by the communication unit 110 from the terminal apparatus 10 of the distributor via the BC server apparatus 20A.

(4) Playback Data Generator 130

In a case where the relevant terminal apparatus 10 operates as a distributor's terminal apparatus 10, the playback data generator 130 can generate playback data to be transmitted to the terminal apparatus 10 of each viewer. The playback data may contain at least one of access data and indication data indicated below.

i. Access Data

The access data may indicate a method for accessing a second video stored in the video distribution server apparatus 20B and currently played back by the terminal apparatus 10 of the distributor.

One example of the access data may be a uniform resource locator (URL). Another example of the access data may be a uniform resource identifier (URI). The terminal apparatus 10 of each viewer designates this URL or URI in the video reception application to access the video distribution server apparatus 20B, so as to receive, from the video distribution server apparatus 20B, a second video identical to the second video currently being received from the video distribution server apparatus 20B and played back by the terminal apparatus 10 of the distributor.

ii. Indication Data (Indication Information)

The indication data may indicate operation to be performed on a second video by the terminal apparatus 10 of each viewer in synchronization with the playback of the second video by the terminal apparatus 10 of the distributor. This second video is stored in the video distribution server apparatus 20B and is currently being played back by the terminal apparatus 10 of the distributor. For example, the indication data may contain at least one of the following indications or at least one of the following commands.

a. An indication of a specific playback position (such as a time stamp) of the second video (or a command indicating that the second video is to be played back from the specific playback position)

This allows the terminal apparatus 10 of each viewer to jump to the indicated playback position and play back the second video from the playback position.

b. An indication of a fixed playback position (such as a time stamp) of the second video (or a command indicating that the playback of the second video is to be temporarily stopped)

This allows the terminal apparatus 10 of each viewer to temporarily stop playing back the second video.

c. An indication of a temporally variable playback position (such as a time stamp) of the second video (or a command indicating that the temporarily stopped playback of the second video is to be resumed)

This allows the terminal apparatus 10 of each viewer to resume the temporarily stopped playback of the second video.

d. An indication of a playback position (such as a time stamp) of the second video temporally varied at 1/X times the normal speed (X being a positive or negative value) (or a command indicating that the second video is to be played back at X times the normal speed)

This allows the terminal apparatus 10 of each viewer to vary the playback speed and the playback direction of the second video.

The playback data generator 130 can generate playback data containing such access data and/or indication data at every unit time. A unit time may be a fixed unit time, a variable unit time, or a combination of a fixed unit time and a variable unit time. A unit time may be, for example, a time included within a range of 0.01 seconds to 1 minute, or may preferably be a time included within a range of 0.05 seconds to 1 second.

(5) Video Generator 140

In a case where the relevant terminal apparatus 10 operates as a distributor's terminal apparatus 10, the video generator 140 can generate a first video by using configuration data generated by the configuration data generator 100 of the relevant terminal apparatus 10. In contrast, in a case where the relevant terminal apparatus 10 operates as a viewer's terminal apparatus 10, the video generator 140 can generate a first video by using configuration data transmitted by the terminal apparatus 10 of the distributor and received by the communication unit 110 of the relevant terminal apparatus 10.

In detail, the video generator 140 can execute rendering by applying motion data contained in the configuration data to distributor's avatar data contained in the configuration data. Accordingly, the video generator 140 can generate a video (first video) containing an animation of the distributor's avatar moving in synchronization with the motion of the distributor. The term "rendering" in this case may include any technique known to a skilled person and may be, for example, a rendering process including perspective projection and hidden surface removal (rasterization). Such a rendering process may also include shading and/or texture mapping.

Furthermore, the video generator 140 can combine the first video generated in this manner with audio data (e.g., an MPEG file) contained in the configuration data. In detail, the video generator 140 can incorporate the audio data into the first video such that a time stamp contained in the motion data matches (or substantially matches) a stamp contained in the audio data. Accordingly, the animation of the distributor's avatar moving in accordance with the motion of the distributor and the distributor's speech played back based on the audio data can be synchronized or substantially synchronized with each other in the first video.

In order to generate the first video containing the animation of the distributor's avatar based on the motion data related to the motion of the distributor, the video generator 140 may use any other known technique. Such a known technique includes a technique called "Blend Shapes" described in a specific website according to the following URL:

https://developer.apple.com/documentation/arkit/arface-anchor/2928251-blendshapes The entire contents described in this website are incorporated in this specification by reference.

When using this technique, the video generator 140 can adjust the parameter of at least one feature point corresponding to the motion of the distributor among a plurality of feature points of the upper body (such as the face) of the distributor. Accordingly, the video generator 140 can generate a video of an avatar that follows the motion of the distributor.

(6) Display Unit 150

The display unit 150 can display various data to be used for distributing and/or viewing a video. For example, the display unit 150 can display a first video generated by the video generator 140 and/or a second video played back by the video playback unit 120.

(7) Storage Unit 160

The storage unit 160 can store various data to be used for distributing and/or viewing a video.

(8) User Interface Unit 170

The user interface unit 170 can be operated by a user for inputting various data to be used for distributing and/or viewing a video.

3.2. Function of Broadcast (BC) Server Apparatus 20A

Figure 4:
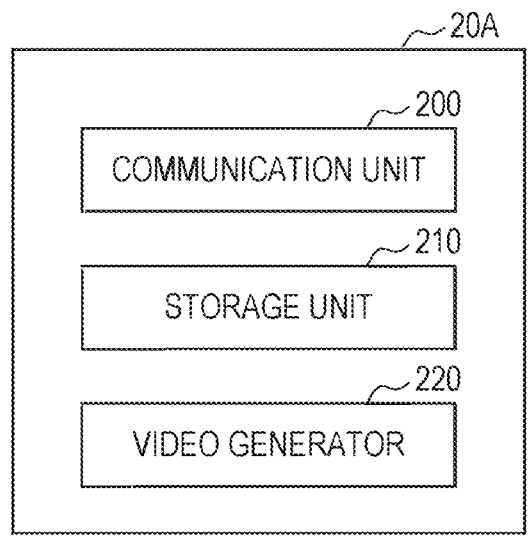
FIG. 4 is a block diagram schematically illustrating an example of the function of a broadcast server apparatus illustrated in FIG. 1.

An example of the function of the BC server apparatus 20A will now be described with reference to FIG. 4. FIG. 4 is a block diagram schematically illustrating an example of the function of the BC server apparatus 20A illustrated in FIG. 1. As illustrated in FIG. 4, the BC server apparatus 20A may mainly include a communication unit 200 and a storage unit 210. Moreover, the BC server apparatus 20A may also optionally include a video generator 220.

The communication unit 200 can allow the terminal apparatus 10 of the distributor and/or the terminal apparatuses 10 of the viewers to exchange various data to be used for distributing a video. For example, the communication unit 200 can distribute configuration data or a first video received from the terminal apparatus 10 of the distributor to the terminal apparatus 10 of each viewer. Moreover, the communication unit 200 can distribute playback data received from the terminal apparatus 10 of the distributor to the terminal apparatus 10 of each viewer.

The storage unit 210 can store various data to be used for distributing a video and received from the communication unit 200.

In a case where the optionally provided video generator 220 receives configuration data from the terminal apparatus 10 of the distributor, the video generator 220 can generate a first video by using this configuration data in place of the terminal apparatus 10 of each viewer. The first video generated in this manner may be distributed to the terminal apparatus 10 of each viewer by the communication unit 200. In order to generate the first video from the received configuration data, the video generator 220 may have a configuration similar to that of the video generator 140 in each terminal apparatus 10.

3.3. Function of Video Distribution Server Apparatus 20B

Figure 5:
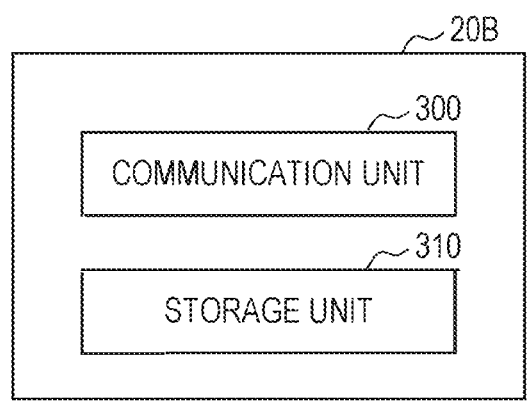
FIG. 5 is a block diagram schematically illustrating an example of the function of a video distribution server apparatus illustrated in FIG. 1.

An example of the function of the video distribution server apparatus 20B will now be described with reference to FIG. 5. FIG. 5 is a block diagram schematically illustrating an example of the function of the video distribution server apparatus 20B illustrated in FIG. 1. As illustrated in FIG. 5, the video distribution server apparatus 20B may mainly include a communication unit 300 and a storage unit 310.

The communication unit 300 can allow the terminal apparatus 10 of the distributor and/or the terminal apparatuses 10 of the viewers to exchange various data to be used for distributing a video. For example, the communication unit 300 can receive access data (such as a URL) from the terminal apparatus 10 of the distributor and/or the terminal apparatus 10 of each viewer. Moreover, the communication unit 300 can distribute, as a second video, a video identified from a plurality of videos preliminarily stored in the storage unit 310 based on access data received from the terminal apparatus 10 of the distributor (or the terminal apparatus 10 of each viewer) to the terminal apparatus 10 of the distributor (or the terminal apparatus 10 of each viewer).

The storage unit 310 can store various data to be used for distributing a video and received from the communication unit 300. In particular, the storage unit 310 can preliminarily store a plurality of videos received from the communication unit 300.

3.4. Function of Studio Unit 30

As mentioned above, each studio unit 30 can function similarly to a terminal apparatus 10 and/or the BC server apparatus 20A. Therefore, each studio unit 30 can have the function of each terminal apparatus 10 described with reference to FIG. 3 and/or the function of the BC server apparatus 20A described with reference to FIG. 4.

4. Operation of Video Distribution System 1

Figure 6A:
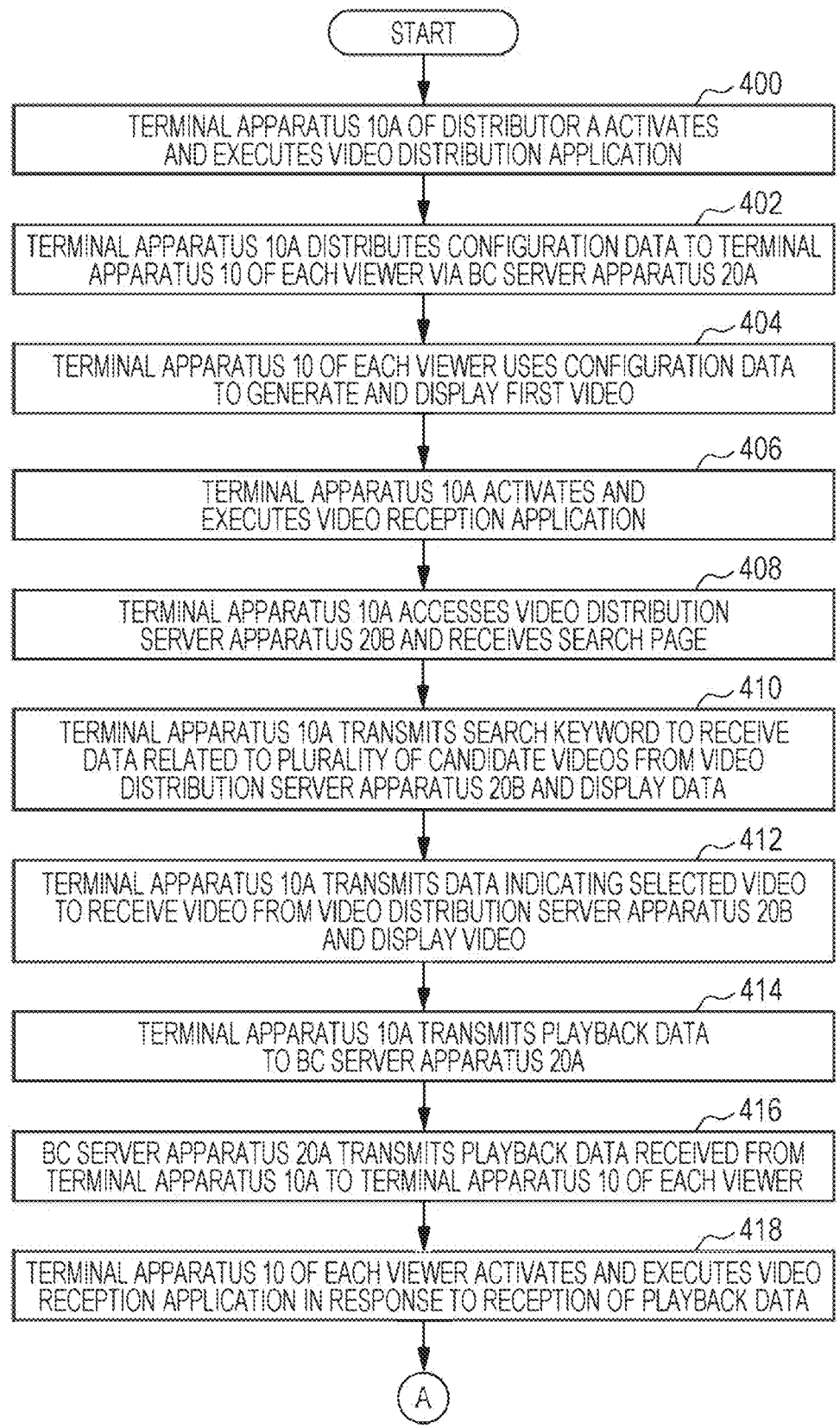
FIG. 6A is a flowchart illustrating an example of operation performed in the video distribution system illustrated in FIG. 1.
Figure 6B:
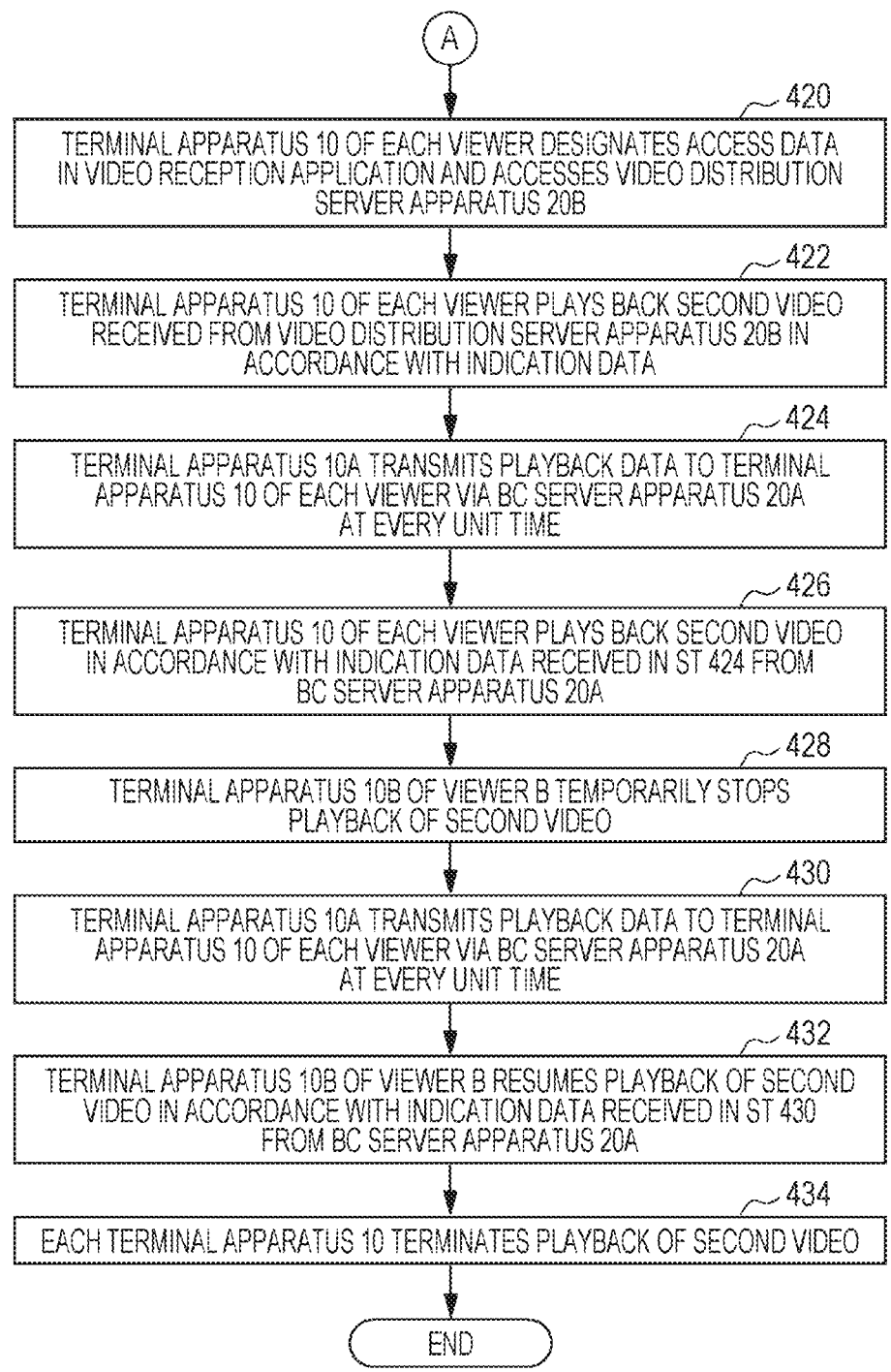
FIG. 6B is a flowchart illustrating the example of the operation performed in the video distribution system illustrated in FIG. 1.

Next, the operation performed in the video distribution system 1 having the above-described configuration will be described with reference to FIGS. 6A and 6B. FIGS. 6A and 6B are flowcharts illustrating an example of the operation performed in the video distribution system 1 illustrated in FIG. 1.

In step (referred to as "ST" hereinafter) 400, the terminal apparatus 10A of the distributor (e.g., distributor A) can activate and execute the video distribution application.

In ST 402, the terminal apparatus 10A of the distributor A can generate configuration data at every unit time and transmit the configuration data to the BC server apparatus 20A. The BC server apparatus 20A can distribute the configuration data received at every unit time from the terminal apparatus 10A of the distributor A to the terminal apparatus 10 of each viewer executing the video distribution application. The terminal apparatus 10A of the distributor A may generate a first video containing an animation of an avatar of the distributor A and an audio signal related to speech of the distributor A by using the generated configuration data, and display the first video to the distributor A.

Figure 7:
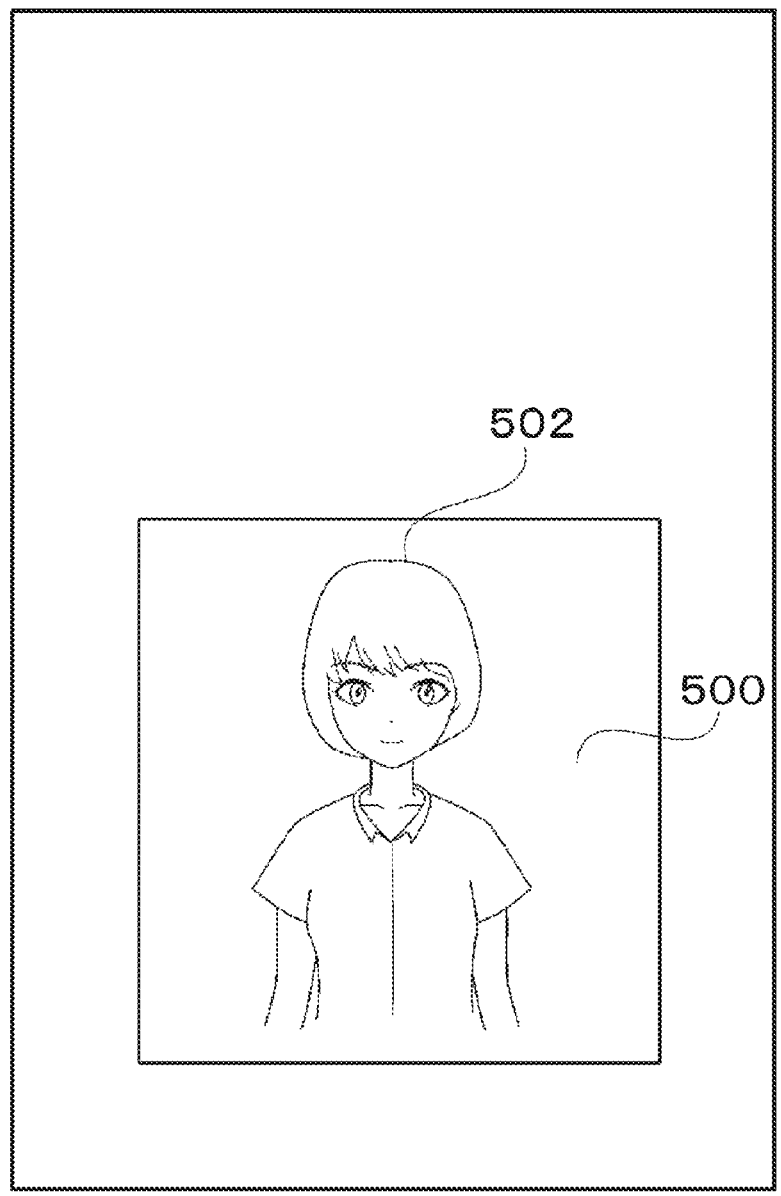
FIG. 7 schematically illustrates an example of a first video displayed by the terminal apparatus of each viewer illustrated in FIG. 1.

In ST 404, the terminal apparatus 10 of each viewer can generate a first video containing an animation of an avatar of the distributor A and an audio signal related to speech of the distributor A by using the configuration data received at every unit time from the BC server apparatus 20A, and display the first video. FIG. 7 illustrates an example of the first video displayed on the terminal apparatus 10 of each viewer. As illustrated in FIG. 7, the first video may contain an animation of an avatar 502 of the distributor A.

Such processes in ST 402 and ST 404 may be repeatedly executed at every unit time. ST 406 to ST 434 to be described below may be executed concurrently with such repeated processes in ST 402 and ST 404.

In ST 406, the terminal apparatus 10A of the distributor A, while executing the video distribution application, can activate and execute the video reception application in accordance with an operation performed using a user interface by the distributor A (e.g., an operation involving the distributor A tapping a video reception icon displayed at a lower section of a screen). In one embodiment, the terminal apparatus 10A of the distributor A can execute the video reception application and receive a second video 530 from the video distribution server apparatus 20B. In another embodiment, the terminal apparatus 10A of the distributor A can receive a second video from a video distribution server apparatus selected from a plurality of video distribution server apparatuses. In this case, for example, the terminal apparatus 10A may display video reception icons corresponding to the plurality of video distribution server apparatuses (i.e., video distribution services) at the lower section of the screen, and the distributor A may tap a video reception icon corresponding to a desired video distribution service. Accordingly, the terminal apparatus 10A can execute the video reception application corresponding to the video reception icon selected by the distributor A, and receive a second video from the corresponding video distribution server apparatus.

Figure 8:
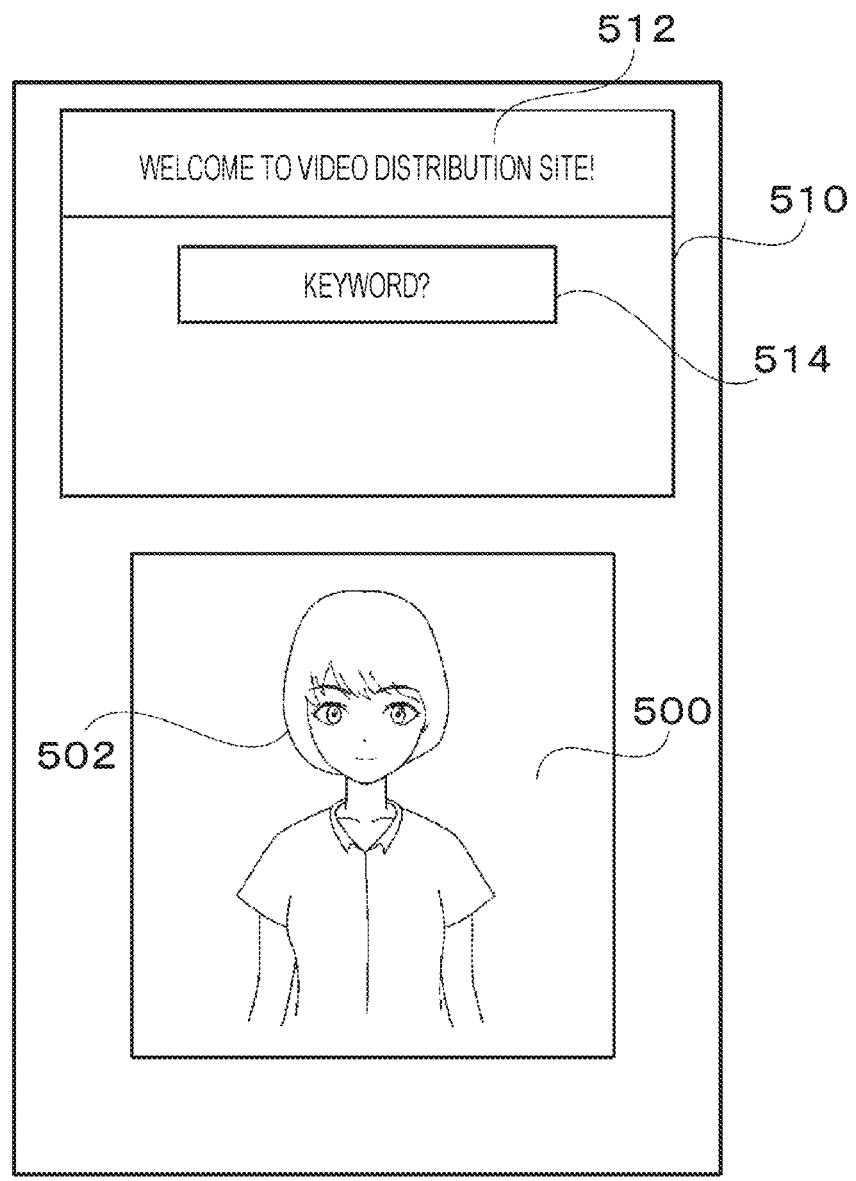
FIG. 8 schematically illustrates an example of a webpage displayed by the terminal apparatus of a distributor illustrated in FIG. 1.

In ST 408, the terminal apparatus 10A of the distributor A can designate predetermined access data (e.g., a URL or URI presented by the video distribution server apparatus 20B and used for identifying a video search webpage) in the video reception application. Accordingly, the terminal apparatus 10A of the distributor A can receive a video search webpage from the video distribution server apparatus 20B. FIG. 8 illustrates an example of the video search webpage displayed on the terminal apparatus 10A of the distributor A. As illustrated in FIG. 8, the terminal apparatus 10A of the distributor A can display a video search webpage 512 received from the video distribution server apparatus 20B in a region 510 different from the display region of a first video 500. This webpage 512 may include a region 514 for inputting a search keyword. Such a webpage 512 is received and displayed only by the terminal apparatus 10A of the distributor A, and is not to be received or displayed on the terminal apparatus 10 of each viewer. The terminal apparatus 10 of each viewer can still display the first video 500, as illustrated in FIG. 7.

Figure 9:
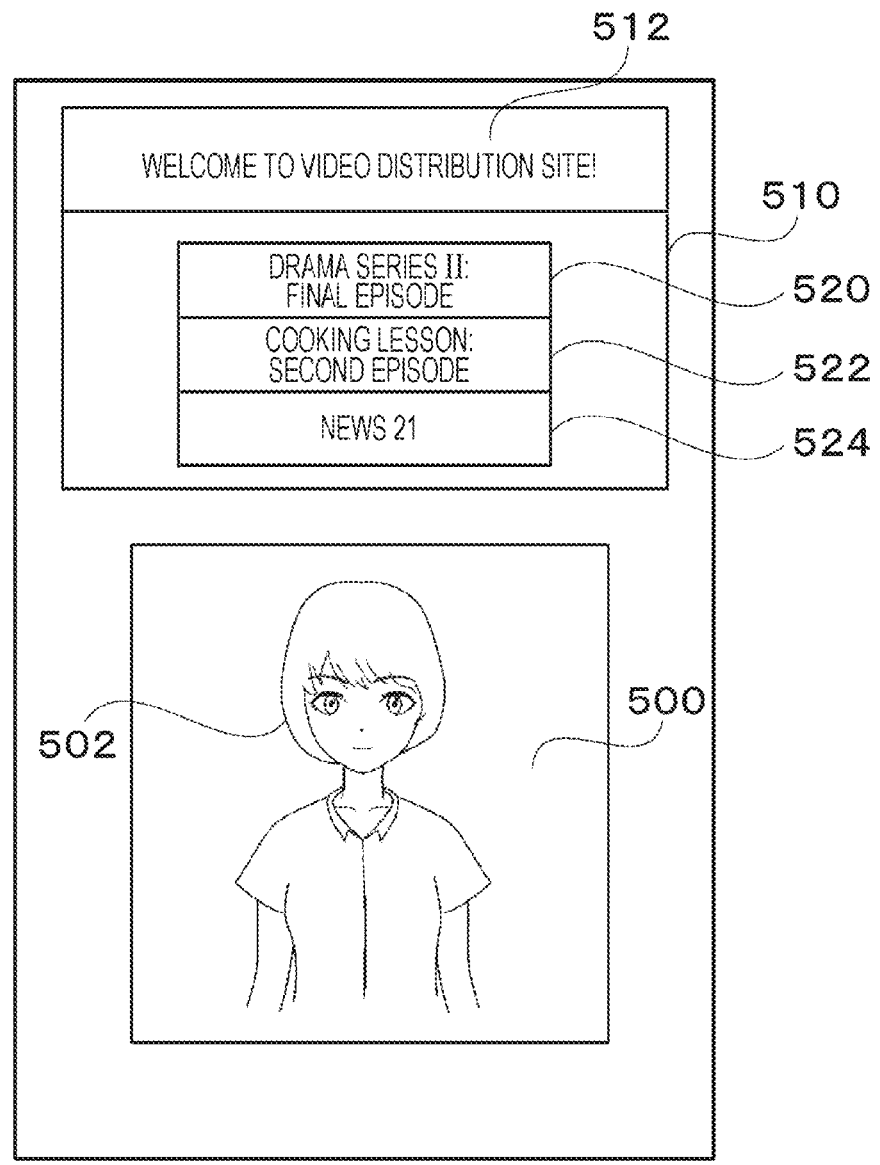
FIG. 9 schematically illustrates another example of the webpage displayed by the terminal apparatus of the distributor illustrated in FIG. 1.

In ST 410, the terminal apparatus 10A of the distributor A can transmit, to the video distribution server apparatus 20B, a search keyword input as a result of an operation performed using the user interface by the distributor A. Accordingly, the terminal apparatus 10A of the distributor A can receive data (i.e., playback candidate data) related to a plurality of candidate videos associated with the search keyword from the video distribution server apparatus 20B and display the data. As illustrated in FIG. 9, the data related to the plurality of candidate videos that may be received and displayed by the terminal apparatus 10A of the distributor A include data 520 related to a first candidate video, data 522 related to a second candidate video, and data 524 related to a third candidate video. The data 520 related to the first candidate video may include a title "Drama Series II: Final Episode" of this first candidate video. Likewise, the data 522 related to the second candidate video and the data 524 related to the third candidate video may include a title "Cooking Lesson: Second Episode" of the second candidate video and a title "News 21" of the third candidate video, respectively. The data related to each candidate video may also contain a thumbnail image of the candidate video, a description of the candidate video, the number of times the candidate video has been viewed by other users (such as the distributor and/or viewers), and/or comments posted with respect to the candidate video.

The data 520 to the data 524 related to the plurality of candidate videos are received and displayed only by the terminal apparatus 10A of the distributor A, and are not to be received or displayed by the terminal apparatus 10 of each viewer. The terminal apparatus 10 of each viewer can still display the first video 500, as illustrated in FIG. 7.

Figure 10:
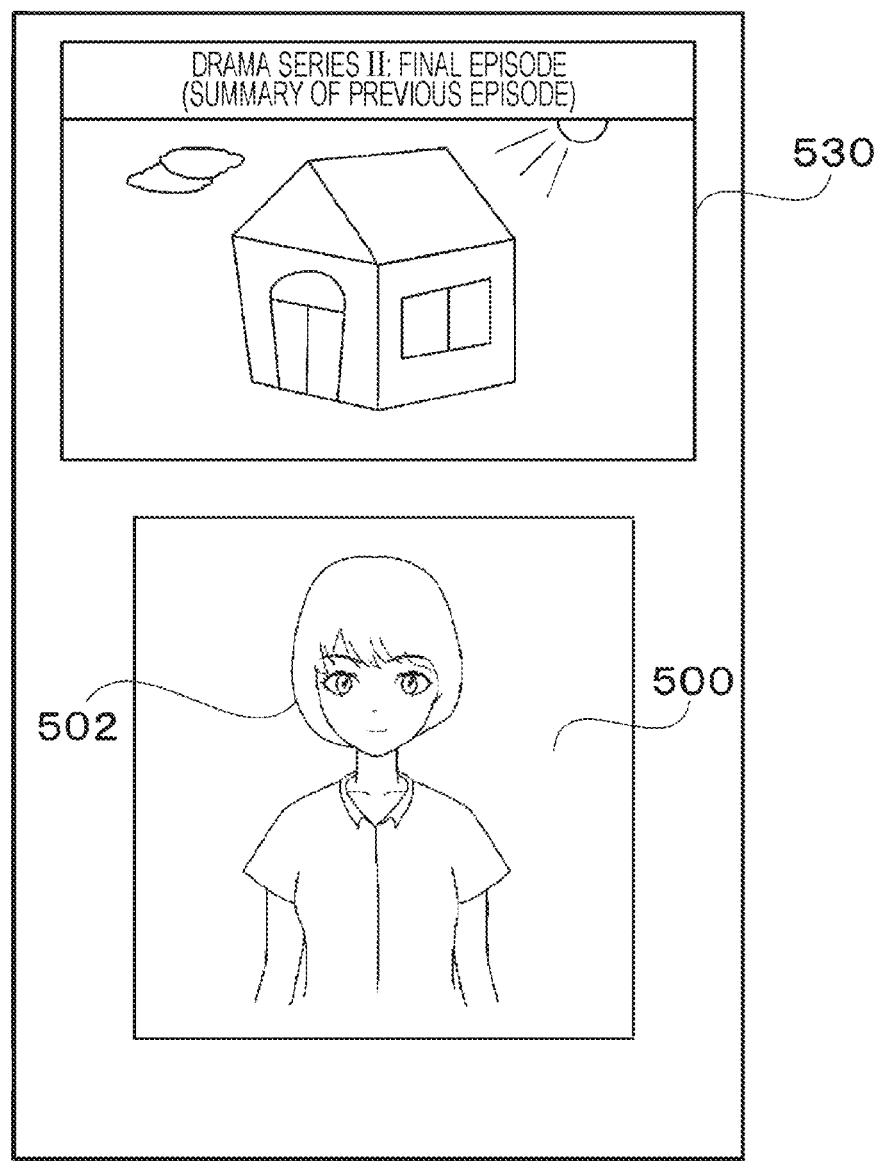
FIG. 10 schematically illustrates an example of the first video and a second video simultaneously displayed by the terminal apparatus of the distributor illustrated in FIG. 1.

In ST 412, the terminal apparatus 10A of the distributor A can transmit, to the video distribution server apparatus 20B, data indicating the selected video (second video) input as a result of an operation performed using the user interface by the distributor A. This data corresponds to access data (such as a URL or URI) indicating a method for accessing the second video stored by the video distribution server apparatus 20B and played back by the terminal apparatus 10A of the distributor A. Accordingly, the terminal apparatus 10A of the distributor A can receive the second video from the video distribution server apparatus 20B and display (play back) the second video. Consequently, as illustrated in FIG. 10, the terminal apparatus 10A of the distributor A can play back and display a second video 530, for example, above the first video 500.

In ST 414, the terminal apparatus 10A of the distributor A can transmit, to the BC server apparatus 20A this time instead of the video distribution server apparatus 20B, playback data containing the aforementioned access data and indication data indicating operation to be performed on the second video by the terminal apparatus 10 of each viewer in synchronization with the second video from the terminal apparatus 10A. At this point, the terminal apparatus 10A of the distributor A may allow the indication data to indicate the current playback position of the second video in this terminal apparatus 10A.

In ST 416, the BC server apparatus 20A can transmit, to the terminal apparatus 10 of each viewer, the playback data received from the terminal apparatus 10A of the distributor A.

In ST 418, the terminal apparatus 10 of each viewer, while executing the video distribution application, can activate and execute the video reception application in response to reception of the playback data from the BC server apparatus 20A.

Referring to FIG. 6B, in ST 420, the terminal apparatus 10 of each viewer can designate the access data (contained in the playback data received in ST 418) in the video reception application. Accordingly, the terminal apparatus 10 of each viewer can access the video distribution server apparatus 20B and receive the second video from the video distribution server apparatus 20B.

In ST 422, the terminal apparatus 10 of each viewer can play back and display the second video received from the video distribution server apparatus 20B in accordance with the playback position designated in the indication data (contained in the playback data received in ST 418). Similar to the terminal apparatus 10A of the distributor A, the terminal apparatus 10 of each viewer can play back and display the second video 530, for example, above the first video 500, as illustrated in FIG. 10 (illustrating the first video 500 and the second video 530 displayed by the terminal apparatus 10A of the distributor A).

In ST 424, the terminal apparatus 10A of the distributor A playing back the second video can transmit the playback data to the terminal apparatus 10 of each viewer via the BC server apparatus 20A at every unit time. The access data contained in the playback data is identical to the access data transmitted in ST 414. The reason that the terminal apparatus 10A of the distributor A transmits the identical access data by using the playback data at every unit time in this manner is that the terminal apparatus 10 of the viewer who has started viewing the first video of the distributor A from an intermediate point can still reliably acquire the access data and receive the second video identical to the second video that is currently being played back by the terminal apparatus 10A of the distributor A. Moreover, the indication data contained in the playback data may indicate the current playback position of the second video in the terminal apparatus 10A.

In ST 426, the terminal apparatus 10 of each viewer can play back and display the second video in accordance with the playback position designated in the indication data (contained in the playback data received in ST 424).

Subsequently, ST 424 and ST 426 may be repeatedly executed.

Accordingly, the terminal apparatus 10 of each viewer can continue to play back the second video at a timing synchronous with or substantially synchronous with the playback of the second video by the terminal apparatus 10A of the distributor A. However, it is conceivable that, for example, a time lag occurring between a timing at which the terminal apparatus 10A of the distributor A transmits the playback data at a certain unit time and a timing at which the terminal apparatus 10 of each viewer receives this playback data via the BC server apparatus 20A may possibly cause a time lag to occur between the playback position of the second video by the terminal apparatus 10A of the distributor A and the playback position of the second video by the terminal apparatus 10 of the viewer.

In ST 428, a situation where the terminal apparatus 10B of a certain viewer (e.g., viewer B) temporarily stops playing back the second video may conceivably occur in accordance with an operation performed using the user interface by the viewer B. Such a situation may occur when the viewer B is temporarily not able to view the second video due to a certain reason. In this case, the terminal apparatus 10A of the distributor A and the terminal apparatuses 10 of other viewers can still continue to play back the second video, as described above.

Subsequently, in ST 430, the terminal apparatus 10A of the distributor A playing back the second video can transmit the playback data to the terminal apparatus 10 of each viewer via the BC server apparatus 20A at every unit time, similarly to ST 424 described above.

In ST 432, the terminal apparatus 10B of the viewer B can resume the playback of the second video in accordance with an operation performed using the user interface by the viewer B. The terminal apparatus 10B can resume the playback of the second video not from the playback position where the playback is temporarily stopped in ST 428, but from the playback position designated in the indication data contained in the playback data (i.e., the most recent playback data) received in ST 430 described above. Accordingly, the terminal apparatus 10B of the viewer B can play back the second video at a timing synchronous with the playback position of the second video in the terminal apparatus 10A of the distributor A, instead of a different (delayed) timing from the terminal apparatus 10A of the distributor A.

Subsequently, in ST 434, the terminal apparatus 10A of the distributor A and the terminal apparatus 10 of each viewer can terminate the playback of the second video. In this case, the terminal apparatus 10 of each viewer can still generate the first video 500 by using the configuration data transmitted from the terminal apparatus 10A of the distributor A via the BC server apparatus 20A and display the first video 500 (and the terminal apparatus 10A of the distributor A can also generate the first video 500 by using the configuration data and display the first video 500).

Finally, the terminal apparatus 10A of the distributor A ends the process by stopping the transmission of the configuration data.

5. Modifications

In the various embodiments described above, the terminal apparatus 10 of each viewer can generate the first video 500 by using the configuration data received from the BC server apparatus 20A and display the first video 500 while concurrently receiving and playing back the second video 530 from the video distribution server apparatus 20B. This implies that the terminal apparatus 10 of each viewer outputs both the audio signal contained in the second video 530 and the audio signal contained in the first video 500 from an output unit, such as a loudspeaker. In this case, for a viewer who desires to listen to the audio signal contained in the second video 530, the audio signal contained in the first video 500 may possibly make it difficult for the viewer to hear the audio signal contained in the second video 530. Likewise, for a viewer who desires to listen to the audio signal contained in the first video 500, the audio signal contained in the second video 530 may possibly make it difficult for the viewer to hear the audio signal contained in the first video 500.

The terminal apparatus 10 of each viewer may have a mixing function that can adjust the level of the audio signal contained in the second video 530 independently of the audio signal contained in the first video 500. Achieving such a function for independently adjusting the levels of a plurality of input audio signals by using software (or a software module) is a commonly-known technique.

Figure 11:
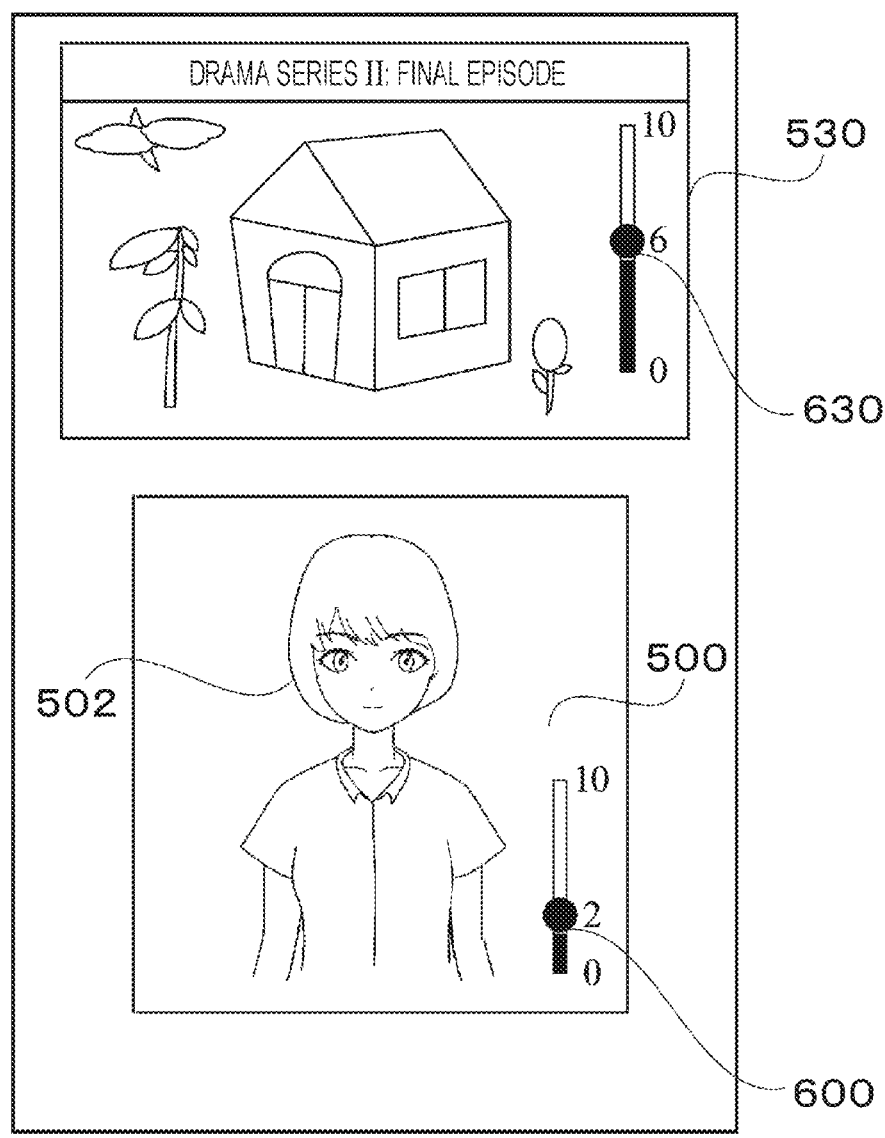
FIG. 11 schematically illustrates an example of the first video and the second video simultaneously displayed by the terminal apparatus of each viewer illustrated in FIG. 1.

In one embodiment, the function for independently adjusting the levels of a plurality of input audio signals can be executed in conjunction with an operation performed using the user interface by each viewer. For example, as illustrated in FIG. 11, the terminal apparatus 10 of each viewer may display a slider 600 in association with the first video 500 and a slider 630 in association with the second video 530. The slider 600 is used for adjusting the level of the audio signal contained in the first video 500. The slider 630 is used for adjusting the level of the audio signal contained in the second video 530. The slider 600 and the slider 630 can be each regarded as an object that is movable in accordance with an operation performed using the user interface by each viewer.

When the viewer raises or lowers the slider 630 by using the user interface, the terminal apparatus 10 of the viewer can increase or decrease the level of the audio signal contained in the second video 530 independently of the audio signal contained in the first video 500. Along with this, the terminal apparatus 10 of the viewer may display a numerical value (e.g., "6") indicating the level of the audio signal contained in the second video 530 to, for example, the right of the slider 630.

Likewise, when the viewer raises or lowers the slider 600 by using the user interface, the terminal apparatus 10 of the viewer can increase or decrease the level of the audio signal contained in the first video 500 independently of the audio signal contained in the second video 530. Along with this, the terminal apparatus 10 of the viewer may display a numerical value (e.g., "2") indicating the level of the audio signal contained in the first video 500 to, for example, the right of the slider 600.

In the configuration illustrated in FIG. 11, the terminal apparatus 10 of each viewer displays both the slider 600, which is used for adjusting the level of the audio signal contained in the first video 500, in association with the first video 500 and the slider 630, which is used for adjusting the level of the audio signal contained in the second video 530, in association with the second video 530. Alternatively, the terminal apparatus 10 of each viewer may display only one of the slider 600, which is used for adjusting the level of the audio signal contained in the first video 500, in association with the first video 500 and the slider 630, which is used for adjusting the level of the audio signal contained in the second video 530, in association with the second video 530.

Figure 12:
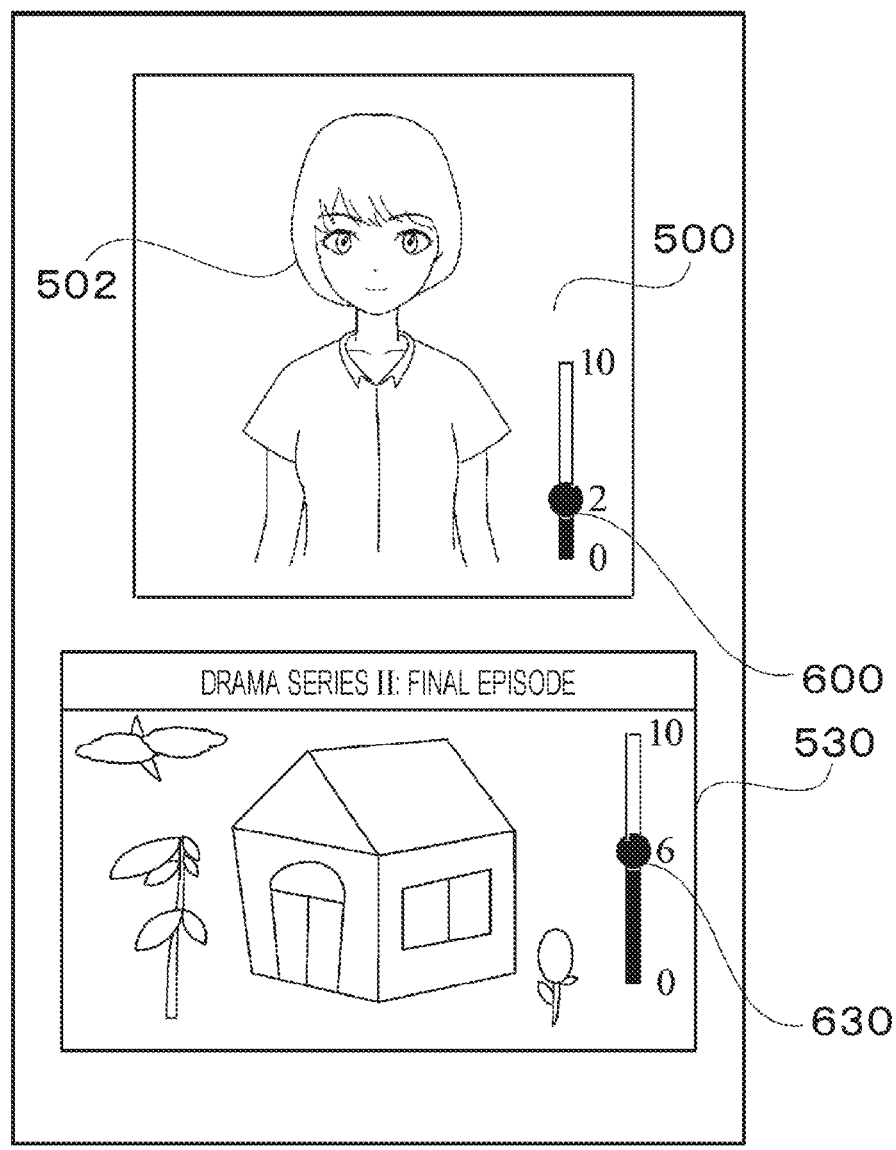
FIG. 12 schematically illustrates another example of the first video and the second video simultaneously displayed by the terminal apparatus of each viewer illustrated in FIG. 1.

FIG. 12 schematically illustrates another example of the first video 500 and the second video 530 displayed simultaneously by the terminal apparatus 10 of each viewer illustrated in FIG. 1. It is apparent from a comparison between FIG. 12 and FIG. 11 that the terminal apparatus 10 of each viewer can move the display region of the second video 530 in conjunction with an operation performed using the user interface by the viewer (e.g., a dragging operation or a swiping operation performed on the display region of the second video 530). Additionally or alternatively, the terminal apparatus 10 of each viewer may move the display region of the first video 500 in conjunction with an operation performed using the user interface by the viewer (e.g., a dragging operation or a swiping operation performed on the display region of the first video 500).

Figure 13:
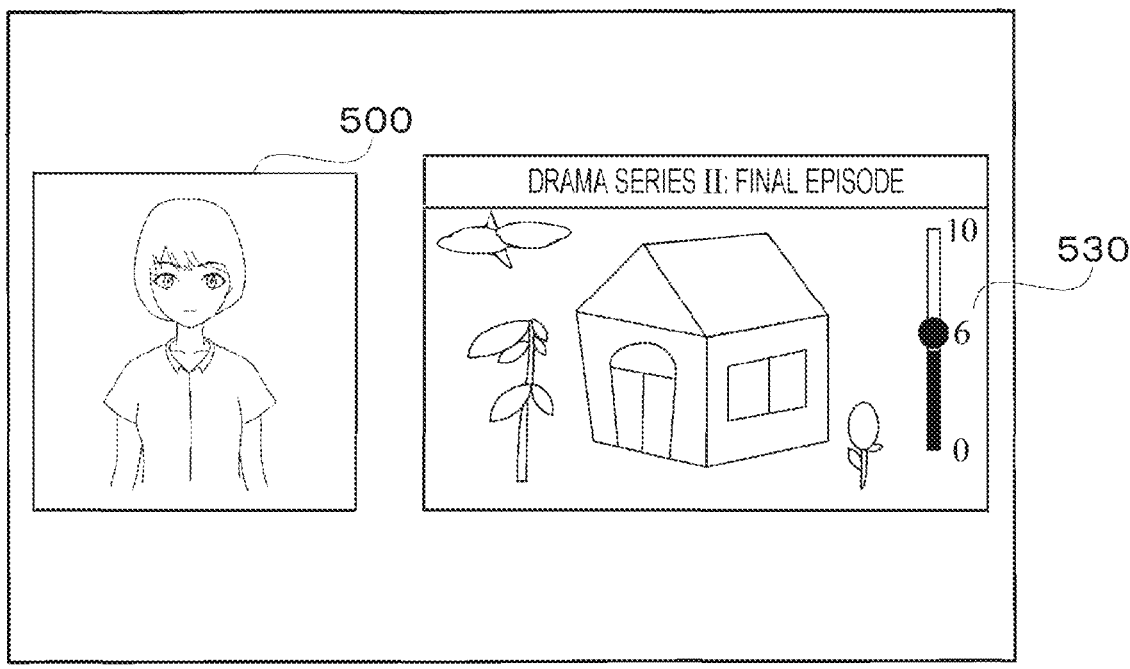
FIG. 13 schematically illustrates yet another example of the first video and the second video simultaneously displayed by the terminal apparatus of each viewer illustrated in FIG. 1.

FIG. 13 schematically illustrates yet another example of the first video 500 and the second video 530 displayed simultaneously by the terminal apparatus 10 of each viewer illustrated in FIG. 1. It is apparent from a comparison between FIG. 12 and FIG. 13 that the terminal apparatus 10 of each viewer can expand or reduce the display region of the second video 530 in conjunction with an operation performed using the user interface by the viewer (e.g., a dragging operation or a swiping operation performed on the display region of the second video 530). Furthermore, the terminal apparatus 10 of each viewer can expand and display the second video 530 over the entire display region or substantially over the entire display region of the terminal apparatus 10 in conjunction with an operation performed using the user interface by the viewer (e.g., a dragging operation or a swiping operation performed on the display region of the second video 530) (in this case, the first video 500 is not displayed).

Additionally or alternatively, the terminal apparatus 10 of each viewer may expand or reduce the display region of the first video 500 in conjunction with an operation performed using the user interface by the viewer (e.g., a dragging operation or a swiping operation performed on the display region of the first video 500). Furthermore, the terminal apparatus 10 of each viewer can expand and display the first video 500 over the entire display region or substantially over the entire display region of the terminal apparatus 10 in conjunction with an operation performed using the user interface by the viewer (e.g., a dragging operation or a swiping operation performed on the display region of the first video 500) (in this case, the second video 530 is not displayed). The example illustrated in FIG. 13 is such that, when the viewer tilts the terminal apparatus 10 to align the longitudinal direction of the terminal apparatus 10 with the horizontal direction, the terminal apparatus 10 arranges the display region of the first video 500 and the display region of the second video 530 in the longitudinal direction.

The various embodiments described above each relate to a case where the terminal apparatus 10 of the distributor distributes configuration data to the terminal apparatus 10 of each viewer via the BC server apparatus 20A. Alternatively, in another embodiment, instead of transmitting configuration data, the terminal apparatus 10 of the distributor may transmit a first video generated based on the configuration data to the terminal apparatus 10 of each viewer via the BC server apparatus 20A. In this case, the first video may be generated based on the configuration data by the terminal apparatus 10 of the distributor or by the BC server apparatus 20A that receives the configuration data from the terminal apparatus 10 of the distributor. Accordingly, the terminal apparatus 10 of each viewer can receive the generated first video and therefore does not have to perform a process for generating the first video based on the configuration data. Consequently, the throughput and the power consumption (e.g., the throughput and the power consumption of the central processing unit 11) in the terminal apparatus 10 of each viewer can be reduced.

Furthermore, the various embodiments described above each relate to a case where the terminal apparatus 10 of the distributor transmits playback data containing both access data and indication data. The terminal apparatus 10 of the distributor transmits access data at every unit time to take into consideration a viewer (referred to as "latecomer viewer" hereinafter) who has not received a first video distributed by the distributor when the distributor starts receiving a second video and who has received the first video distributed by the distributor from an intermediate point, as mentioned above. The terminal apparatus 10 of the distributor transmits access data at every unit time, so that the terminal apparatus 10 of such a latecomer viewer can receive the access data from the terminal apparatus 10 of the distributor sooner or later and can access the video distribution server apparatus 20B by using this access data. Therefore, the terminal apparatus 10 of the latecomer viewer can reliably receive a second video from the video distribution server apparatus 20B.

Alternatively, in another embodiment, the terminal apparatus 10 of the distributor may transmit playback data containing both access data and indication data from when the terminal apparatus 10 starts receiving a second video from the video distribution server apparatus 20B until a predetermined time elapses (e.g., in a range of 1 to 10 minutes), and may transmit playback data containing indication data alone without taking into consideration a latecomer viewer after the predetermined time has elapsed.

Furthermore, in another embodiment, the terminal apparatus 10 of the distributor may receive a second video by live streaming from the video distribution server apparatus 20B instead of receiving a preliminarily stored video therefrom. In this case, the terminal apparatus 10 of the distributor and the terminal apparatus 10 of each viewer sequentially receive segments of the second video from the video distribution server apparatus 20B in real time, instead of receiving the entire second video or a large segment thereof at once from the video distribution server apparatus 20B. Thus, it is often difficult for the terminal apparatus 10 of the distributor to basically change the playback position of the second video. Therefore, if the terminal apparatus 10 of the distributor is to receive a second video by live streaming from the video distribution server apparatus 20B, the terminal apparatus 10 of the distributor can transmit playback data containing access data alone to the terminal apparatus 10 of each viewer at every unit time. Even in this case, all the terminal apparatuses 10 accessing the video distribution server apparatus 20B at a certain timing by using the access data receive substantially the same segment of the second video from the video distribution server apparatus 20B. Specifically, when the video distribution server apparatus 20B is to distribute the second video by live streaming to each terminal apparatus 10, the video distribution server apparatus 20B continues to distribute this second video to all the terminal apparatuses 10 at substantially the same timing. Consequently, the terminal apparatus 10 of the distributor and the terminal apparatus 10 of each viewer can receive the second video at substantially the same timing.

The various embodiments described above each relate to a case where the terminal apparatus 10 of a single distributor activates and executes the video reception application, while independently distributing a first video (i.e., a first video containing an avatar of this distributor), and search for and receive a second video from the video distribution server apparatus 20B. Alternatively, in another embodiment, in a state where the terminal apparatuses 10 of a plurality of distributors are collaboratively distributing a first video (i.e., a first video containing avatars of these plurality of distributors), the terminal apparatus 10 of any distributor selected from these plurality of distributors may activate and execute the video reception application, and search for and receive a second video from the video distribution server apparatus 20B. The distribution of the first video collaboratively by the terminal apparatuses 10 of the plurality of distributors may sometimes be referred to as "collaborative distribution".

Figure 14A:
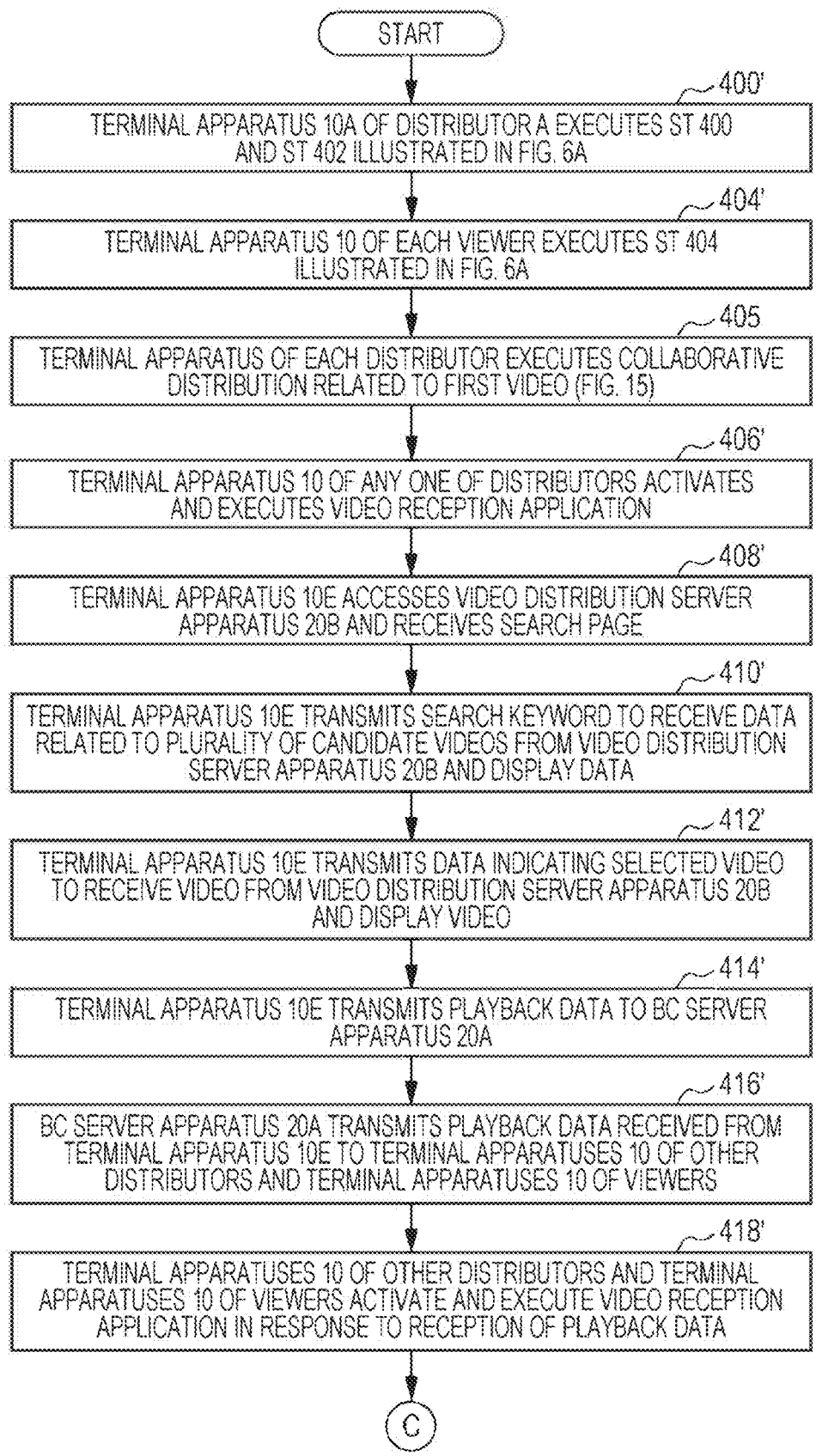
FIG. 14A is a flowchart illustrating another example of the operation performed in the video distribution system illustrated in FIG. 1.
Figure 14B:
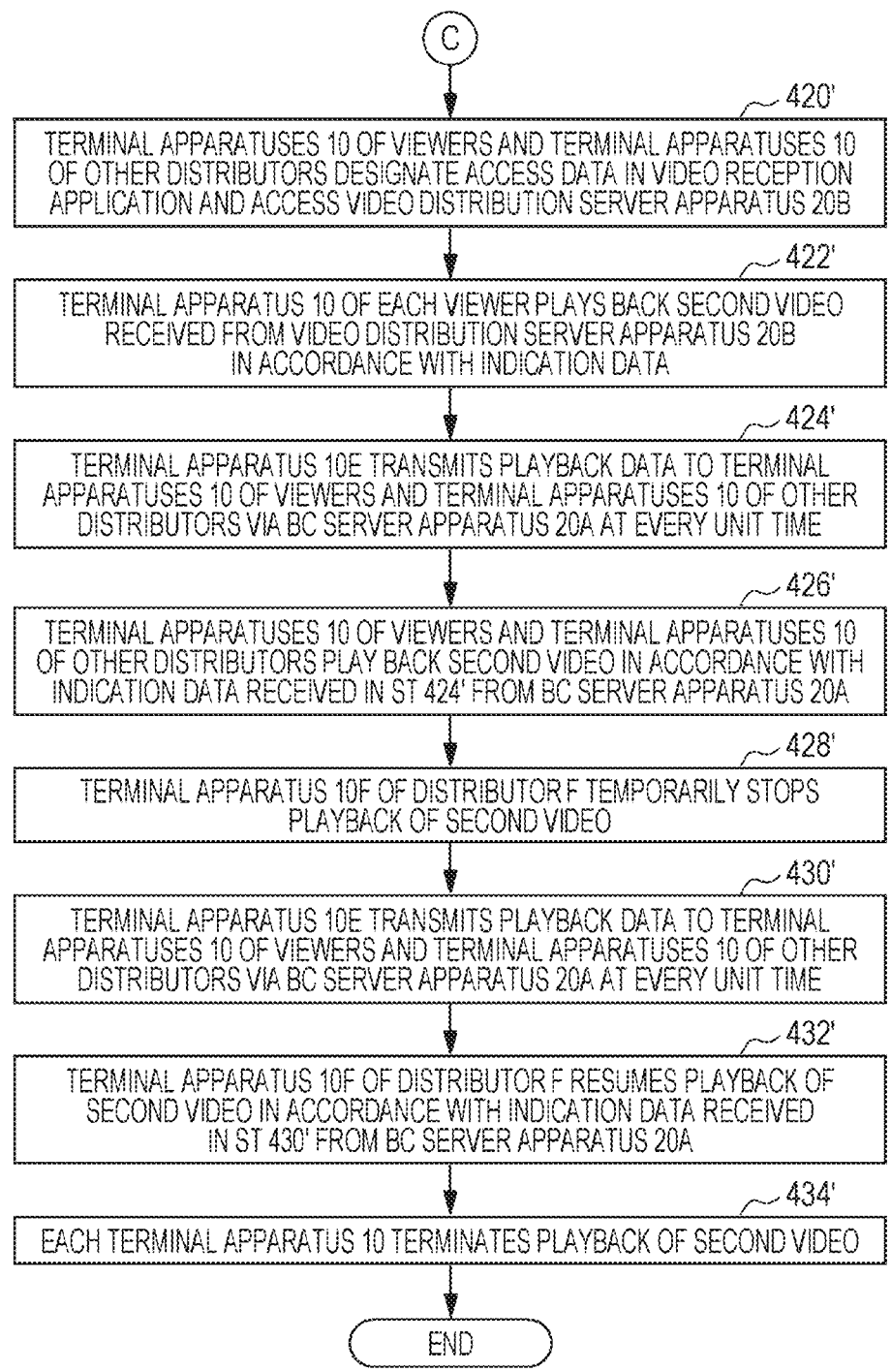
FIG. 14B is a flowchart illustrating another example of the operation performed in the video distribution system illustrated in FIG. 1.

The following description with reference to FIGS. 14A and 14B relates to a specific example where any one of terminal apparatuses of a plurality of distributors searches for and receives a second video in a state where the terminal apparatuses of the plurality of distributors are performing collaborative distribution. FIGS. 14A and 14B are flowcharts illustrating another example of operation performed in the video distribution system 1 illustrated in FIG. 1. With regard to processes illustrated in FIGS. 14A and 14B, the descriptions of processes similar to those described above with reference to FIGS. 6A and 6B will be omitted.

Referring to FIG. 14A, in ST 400', the terminal apparatus 10A of the distributor A can execute processes similar to those in ST 400 and ST 402 described above with reference to FIG. 6A. Subsequently, in ST 404', the terminal apparatus 10 of each viewer can execute a process similar to that in ST 404 described above with reference to FIG. 6A.

Then, in ST 405, the terminal apparatuses 10 of the plurality of distributors can execute collaborative distribution with respect to a first video. The operation related to this collaborative distribution will be described with reference to FIG. 15. FIG. 15 is a flowchart illustrating an example of the operation related to the collaborative distribution performed in the video distribution system 1 illustrated in FIG. 1.

A distributor (i.e., distributor A) who has already started distributing a first video and who is to execute collaborative distribution together with another distributor will be referred to as "host distributor". A viewer who has already started receiving the first video from the host distributor and who is to serve as a guest to execute collaborative distribution together with the host distributor will be referred to as "guest distributor". In order to execute collaborative distribution, there are a host distributor and at least one guest distributor. For simplification, the following description relates to a case where the at least one guest participant includes two guest participants (i.e., a first guest distributor E and a second guest distributor F).

First, in ST 41, a terminal apparatus 10E of the first guest distributor E can transmit participation request data to the BC server apparatus 20A in response to an operation performed by the first guest distributor E. The participation request data may contain identification data for identifying the first guest distributor E. In ST 42, based on a similar method, a terminal apparatus 10F of the second guest distributor F can transmit participation request data to the BC server apparatus 20A in response to an operation performed by the second guest distributor F.

In ST 43, the BC server apparatus 20A can transmit, to the terminal apparatus 10A of the host distributor A, a notification about the participation requests together with the identification data of the guest distributors who have made the participation requests. In response to the notification about the participation requests received from the BC server apparatus 20A, the terminal apparatus 10A can display a screen for approving the participation requests, and allow the host distributor A to select an approval option or a disapproval option with respect to the participation requests. If the host distributor A selects the approval option, the terminal apparatus 10A can transmit a notification indicating that the participation requests have been approved together with the identification data of the approved guest distributors to the BC server apparatus 20A in ST 44.

In ST 45, the BC server apparatus 20A can transmit a participant list including the identification data of the guest distributors given approval for participation to the terminal apparatus 10A of the host distributor A and also to the terminal apparatus 10E of the approved guest distributor E and the terminal apparatus 10F of the approved guest distributor F.

In ST 46, the terminal apparatus 10F of the second guest distributor F recognizes that the identification data of the second guest distributor F is included in the received participant list, so that the terminal apparatus 10F can recognize that the participation request has been approved. Accordingly, the terminal apparatus 10F can generate configuration data at every unit time and transmit the configuration data to the BC server apparatus 20A. This configuration data may be similar to that generated by the terminal apparatus 10A of the distributor A described above with reference to FIG. 6A (ST 402).

In ST 47, the BC server apparatus 20A can transmit the configuration data received from the terminal apparatus 10F to the terminal apparatus 10A of the host distributor A, the terminal apparatus 10E of the first guest distributor E, and the terminal apparatus 10 of each viewer (in this case, for example, the terminal apparatus 10B of the viewer B).

In ST 48, the terminal apparatus 10A of the host distributor A can generate configuration data at every unit time and transmit the configuration data to the BC server apparatus 20A, similarly to ST 402 described above. In ST 49, the BC server apparatus 20A can transmit the configuration data received from the terminal apparatus 10A to the terminal apparatus 10E of the first guest distributor E, the terminal apparatus 10F of the second guest distributor F, and the terminal apparatus 10 of each viewer.

In ST 50, the terminal apparatus 10E of the first guest distributor E recognizes that the identification data of the first guest distributor E is included in the received participant list, so that the terminal apparatus 10E can recognize that the participation request has been approved. Accordingly, the terminal apparatus 10E can generate configuration data at every unit time and transmit the configuration data to the BC server apparatus 20A. This configuration data may be similar to that generated by the terminal apparatus 10A of the distributor A described above with reference to FIG. 6A (ST 402).

In ST 51, the BC server apparatus 20A can transmit the configuration data received from the terminal apparatus 10E to the terminal apparatus 10A of the host distributor A, the terminal apparatus 10F of the second guest distributor F, and the terminal apparatus 10 of each viewer.

The timings at which the terminal apparatus 10A, the terminal apparatus 10E, and the terminal apparatus 10F transmit the configuration data to the other terminal apparatuses 10 are not limited to the timings illustrated in FIG. 15, and may be concurrent with one another or may be in any sequence.

In ST 52, the terminal apparatus 10A of the host distributor A can generate a first video by using the configuration data generated by the terminal apparatus 10A, the configuration data of the terminal apparatus 10E of the first guest distributor E received from the BC server apparatus 20A, and the configuration data of the terminal apparatus 10F of the second guest distributor F received from the BC server apparatus 20A. The terminal apparatus 10A can generate the first video in accordance with a method similar to that described above with reference to FIG. 6A (ST 402). The first video generated in this manner may be an animation including an avatar of the host distributor A, an avatar of the first guest distributor E, and an avatar of the second guest distributor F. As the avatar of the first guest distributor E (or the avatar of the second guest distributor F), the terminal apparatus 10A may use, for example, the avatar contained in the configuration data received from the terminal apparatus 10E of the first guest distributor E (or the terminal apparatus 10F of the second guest distributor F) via the BC server apparatus 20A.

In ST 53, the terminal apparatus 10E of the first guest distributor E can generate a first video by using the configuration data generated by the terminal apparatus 10E, the configuration data of the terminal apparatus 10A of the host distributor A received from the BC server apparatus 20A, and the configuration data of the terminal apparatus 10F of the second guest distributor F received from the BC server apparatus 20A. The terminal apparatus 10E can generate the first video in accordance with a method similar to that described above with reference to FIG. 6A (ST 404). The first video generated in this manner may be an animation including the avatar of the host distributor A, the avatar of the first guest distributor E, and the avatar of the second guest distributor F. As the avatar of the second guest distributor F (or the avatar of the host distributor A), the terminal apparatus 10E may use, for example, the avatar contained in the configuration data received from the terminal apparatus 10F of the second guest distributor F (or the terminal apparatus 10A of the host distributor A) via the BC server apparatus 20A.

In ST 54, the terminal apparatus 10F of the second guest distributor F can generate a first video by using the configuration data generated by the terminal apparatus 10F, the configuration data of the terminal apparatus 10A of the host distributor A received from the BC server apparatus 20A, and the configuration data of the terminal apparatus 10E of the first guest distributor E received from the BC server apparatus 20A. The terminal apparatus 10F can generate the first video in accordance with a method similar to that described above with reference to FIG. 6A (ST 404). The first video generated in this manner may be an animation including the avatar of the host distributor A, the avatar of the first guest distributor E, and the avatar of the second guest distributor F. As the avatar of the first guest distributor E (or the avatar of the host distributor A), the terminal apparatus 10F may use, for example, the avatar contained in the configuration data received from the terminal apparatus 10E of the first guest distributor E (or the terminal apparatus 10A of the host distributor A) via the BC server apparatus 20A.

In ST 55, the terminal apparatus 10 of each viewer (e.g., the terminal apparatus 10B) can generate a first video by using the configuration data of the terminal apparatus 10A of the host distributor A received from the BC server apparatus 20A, the configuration data of the terminal apparatus 10E of the first guest distributor E received from the BC server apparatus 20A, and the configuration data of the terminal apparatus 10F of the second guest distributor F received from the BC server apparatus 20A. The terminal apparatus 10 of each viewer can generate the first video in accordance with a method similar to that described above with reference to FIG. 6A (ST 404). The first video generated in this manner may be an animation including the avatar of the host distributor A, the avatar of the first guest distributor E, and the avatar of the second guest distributor F. As the avatar of the first guest distributor E (or the avatar of the second guest distributor F), the terminal apparatus 10 of each viewer may use, for example, the avatar contained in the configuration data received from the terminal apparatus 10E of the first guest distributor E (or the terminal apparatus 10F of the second guest distributor F) via the BC server apparatus 20A. Likewise, as the avatar of the host distributor A, the terminal apparatus 10 of each viewer may use the avatar contained in the configuration data received from the terminal apparatus 10A of the host distributor A via the BC server apparatus 20A.

Figure 16:
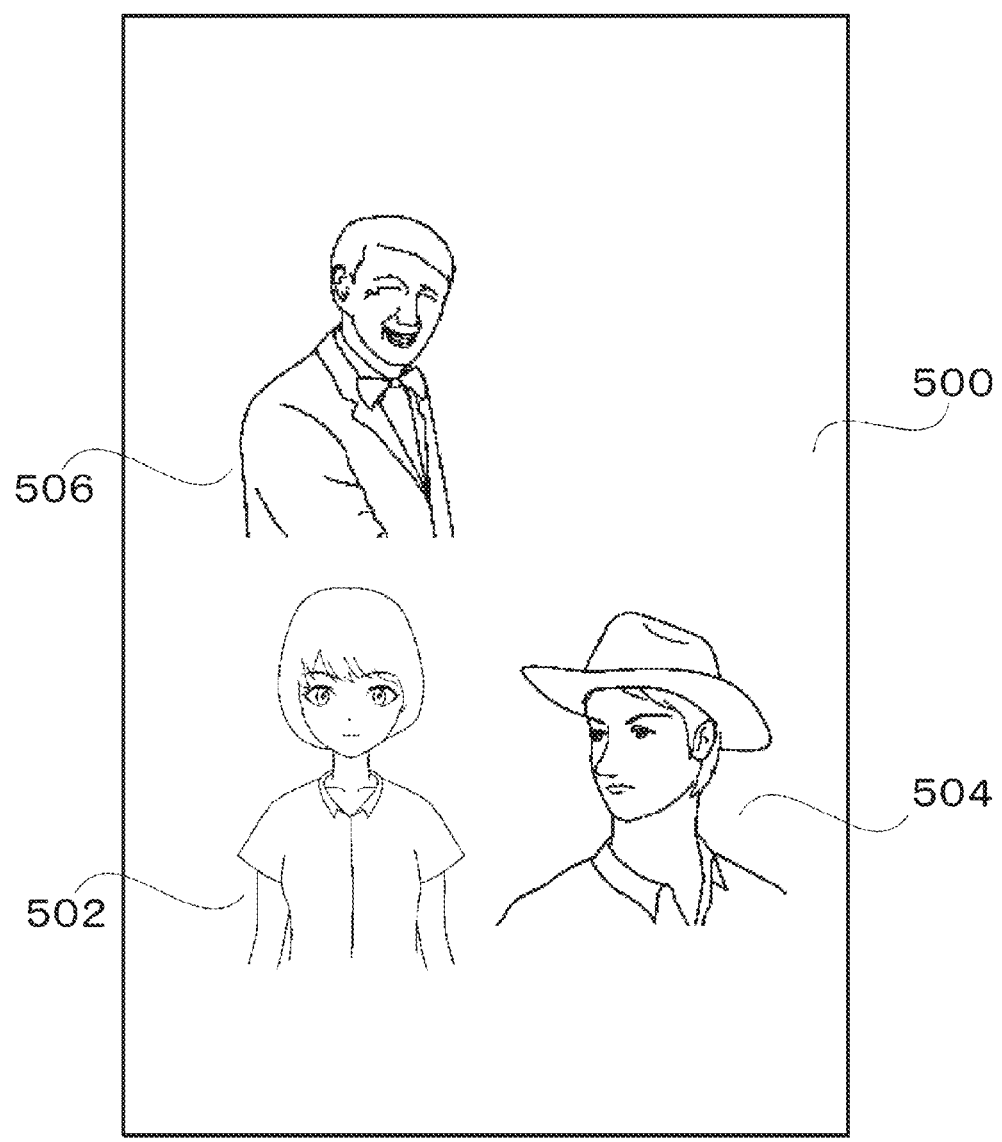
FIG. 16 schematically illustrates an example of the first video generated and displayed by each terminal apparatus used in relation to the collaborative distribution illustrated in FIG. 15.

An example of the first video 500 generated and displayed by each of the terminal apparatus 10A, the terminal apparatus 10E, the terminal apparatus 10F, and the terminal apparatus 10B is illustrated in FIG. 16. FIG. 16 schematically illustrates the example of the first video 500 generated and displayed by each terminal apparatus 10 used in relation to the collaborative distribution illustrated in FIG. 15.

As illustrated in FIG. 16, the first video 500 generated and displayed by each terminal apparatus 10 may be an animation including the avatar 502 of the host distributor A, an avatar 504 of the first guest distributor E, and an avatar 506 of the second guest distributor F. In one embodiment, each terminal apparatus 10 can generate and display the first video 500 in which the avatar 502 of the host distributor A, the avatar 504 of the first guest distributor E, and the avatar 506 of the second guest distributor F are arranged in a lower left region, a lower right region, and an upper left region, respectively.

The description of the embodiment illustrated in FIG. 15 relates to a case where each terminal apparatus 10 generates a first video by using the configuration data of the terminal apparatus 10A of the host distributor A, the configuration data of the terminal apparatus 10E of the first guest distributor E, and the configuration data of the terminal apparatus 10F of the second guest distributor F.

Alternatively, in another embodiment, the terminal apparatus 10 of each of the distributors (i.e., the host distributor A, the first guest distributor E, and the second guest distributor F) may generate a first video by using the pieces of configuration data, similarly to the above description, whereas the terminal apparatus 10 of each viewer may receive the first video generated by the terminal apparatus 10 of any of the distributors via the BC server apparatus 20A and display the first video. In this case, the terminal apparatus 10 of each distributor transmits the configuration data to the terminal apparatuses 10 of the other distributors via the BC server apparatus 20A, as described above, but does not have to transmit the configuration data to the terminal apparatus 10 of each viewer.

In yet another embodiment, only the terminal apparatus 10A of the host distributor A may generate a first video, and the other terminal apparatuses 10 may simply receive the first video generated by the terminal apparatus 10A via the BC server apparatus 20A, without generating a first video by using the configuration data, and may display the first video. In this case, the terminal apparatus 10 of each of the first guest distributor E and the second guest distributor F transmits the configuration data to the terminal apparatus 10A of the host distributor A via the BC server apparatus 20A, but does not have to transmit the configuration data to the terminal apparatus 10 of the other guest distributor or to the terminal apparatuses 10 of the viewers. Furthermore, the terminal apparatus 10A of the host distributor A does not have to transmit the configuration data to any of the terminal apparatuses 10 via the BC server apparatus 20A.

In one embodiment, the BC server apparatus 20A can operate as a single server apparatus, as illustrated in FIG. 15. Alternatively, in another embodiment, the BC server apparatus 20A (i.e., first server apparatus) may include a plurality of server apparatuses (i.e., a plurality of first server apparatuses) connectable to each other in a communicable manner. In this case, when each distributor is to independently distribute a first video (referred to as "single distribution" for the sake of convenience), as illustrated in FIGS. 6A and 6B, one of these plurality of server apparatuses may mainly be responsible for the exchanging of data between the terminal apparatus of this distributor and the terminal apparatus of each viewer. In contrast, when collaborative distribution is to be performed, as illustrated in FIG. 15, the other server apparatus of these plurality of server apparatuses may mainly be responsible for the exchanging of data between the terminal apparatus of the host distributor and the terminal apparatus of each guest distributor, as well as between the terminal apparatuses of the host distributor and each guest distributor and the terminal apparatus of each viewer. Accordingly, the burden of operation can be shared (i.e., the occurring load can be distributed) between the two types of server apparatuses, so that each server apparatus can focus on the operation that the server apparatus is responsible for, whereby the operation can be executed at a higher rate.

In the example illustrated in FIG. 15, one server apparatus mainly responsible for single distribution among the BC server apparatuses 20A may be responsible for, for example, the processes related to ST 41 to ST 45. Subsequently, the other server apparatus mainly responsible for collaborative distribution may be responsible for processes related to ST 46 to the end of the collaborative distribution, in place of the one server apparatus. The timing for switching from the one server apparatus to the other server apparatus may be a freely-chosen timing.

The processes from ST 46 to ST 55 illustrated in FIG. 15 may be repeatedly executed at every unit time. The following processes from ST 406' to ST 434' to be described below may be executed concurrently with such repeated processes in ST 46 to ST 55.

Referring back to FIG. 14A, in ST 406', any one of the plurality of distributors (i.e., the host distributor A, the first guest distributor E, and the second guest distributor F) performs an operation by using the user interface, similarly to ST 406 described above, so that the corresponding terminal apparatus 10 can activate and execute the video reception application. The process in ST 406' may be executed by (the terminal apparatus 10 of) any distributor who desires to search for and distribute a second video, among the plurality of distributors. Alternatively, the process in ST 406' may be executed by the terminal apparatus 10 of the distributor randomly selected by the BC server apparatus 20A from the plurality of distributors. In the following description, it is assumed that the process in ST 406' is executed by the terminal apparatus 10E of the first guest distributor E among the plurality of distributors.

In ST 408', the terminal apparatus 10E can execute the process in ST 408 described above. The webpage 512 illustrated in FIG. 8 is to be received and displayed only by the terminal apparatus 10E of the distributor E, but is not to be received or displayed by the terminal apparatuses 10 of the other distributors and the terminal apparatuses 10 of the viewers.

In ST 410', the terminal apparatus 10E can execute the process in ST 410 described above. The data 520 to the data 524 that are related to candidate videos (see FIG. 9) are also to be received and displayed only by the terminal apparatus 10E of the distributor E, but are not to be received or displayed by the terminal apparatuses 10 of the other distributors and the terminal apparatuses 10 of the viewers.

In ST 412', the terminal apparatus 10E can execute the process in ST 412 described above. In ST 414', the terminal apparatus 10E can execute the process in ST 414 described above.

In ST 416', the BC server apparatus 20A can transmit playback data received from the terminal apparatus 10E not only to the terminal apparatuses 10 of the viewers but also to the terminal apparatuses 10 of the other distributors (i.e., the distributor A and the distributor F).

In addition to the terminal apparatuses 10 of the viewers, the terminal apparatuses 10 of the other distributors (i.e., the distributor A and the distributor F) can also activate and execute the video reception application in ST 418' in response to reception of the playback data from the BC server apparatus 20A.

Referring to FIG. 14B, in ST 420', in addition to the terminal apparatuses 10 of the viewers, the terminal apparatuses 10 of the other distributors can also execute the process in ST 420 described above. Accordingly, similar to the terminal apparatuses 10 of the viewers, the terminal apparatuses 10 of the other distributors can also receive a second video from the video distribution server apparatus 20B.

In ST 422', in addition to the terminal apparatuses 10 of the viewers, the terminal apparatuses 10 of the other distributors can also execute the process in ST 422 described above. Accordingly, similar to the terminal apparatuses 10 of the viewers, the terminal apparatuses 10 of the other distributors can also play back and display the second video received from the video distribution server apparatus 20B in accordance with the playback position designated in indication data (contained in the playback data received in ST 418' described above).

In ST 424', the terminal apparatus 10E of the distributor E playing back the second video can execute the process in ST 424 described above. The terminal apparatus 10E can transmit the playback data not only to the terminal apparatuses 10 of the viewers but also to the terminal apparatuses 10 of the other distributors (i.e., the distributor A and the distributor F) via the BC server apparatus 20A.

In ST 426', in addition to the terminal apparatuses 10 of the viewers, the terminal apparatuses 10 of the other distributors can also execute the process in ST 426 described above. Accordingly, the terminal apparatuses 10 of the other distributors can also play back and display the second video in accordance with the playback position designated in the indication data contained in the playback data received in ST 424' described above.

In ST 428', it is conceivable that the terminal apparatus 10F of a certain distributor (e.g., the second guest distributor F) temporarily stops playing back the second video in accordance with an operation performed using the user interface by the distributor F.

Similarly to ST 430 described above, in ST 430', the terminal apparatus 10E of the distributor E playing back the second video can transmit the playback data to the terminal apparatuses 10 of the viewers and the terminal apparatuses 10 of the other distributors (i.e., the distributor A and the distributor F) via the BC server apparatus 20A at every unit time.

In ST 432', the terminal apparatus 10F of the distributor F can resume the playback of the second video in accordance with an operation performed using the user interface by the distributor F, as described above in ST 432. The terminal apparatus 10F of the distributor F can resume the playback of the second video not from the playback position where the playback is temporarily stopped in ST 428' described above, but from the playback position designated in the indication data contained in the playback data (i.e., the most recent playback data) received in ST 430' described above.

In ST 434', the terminal apparatuses 10 of all the distributors and the terminal apparatuses 10 of the viewers can terminate the playback of the second video. In this case, since ST 46 to ST 55 described above are concurrently executed, each terminal apparatus 10 can still display the first video.

Figure 17:
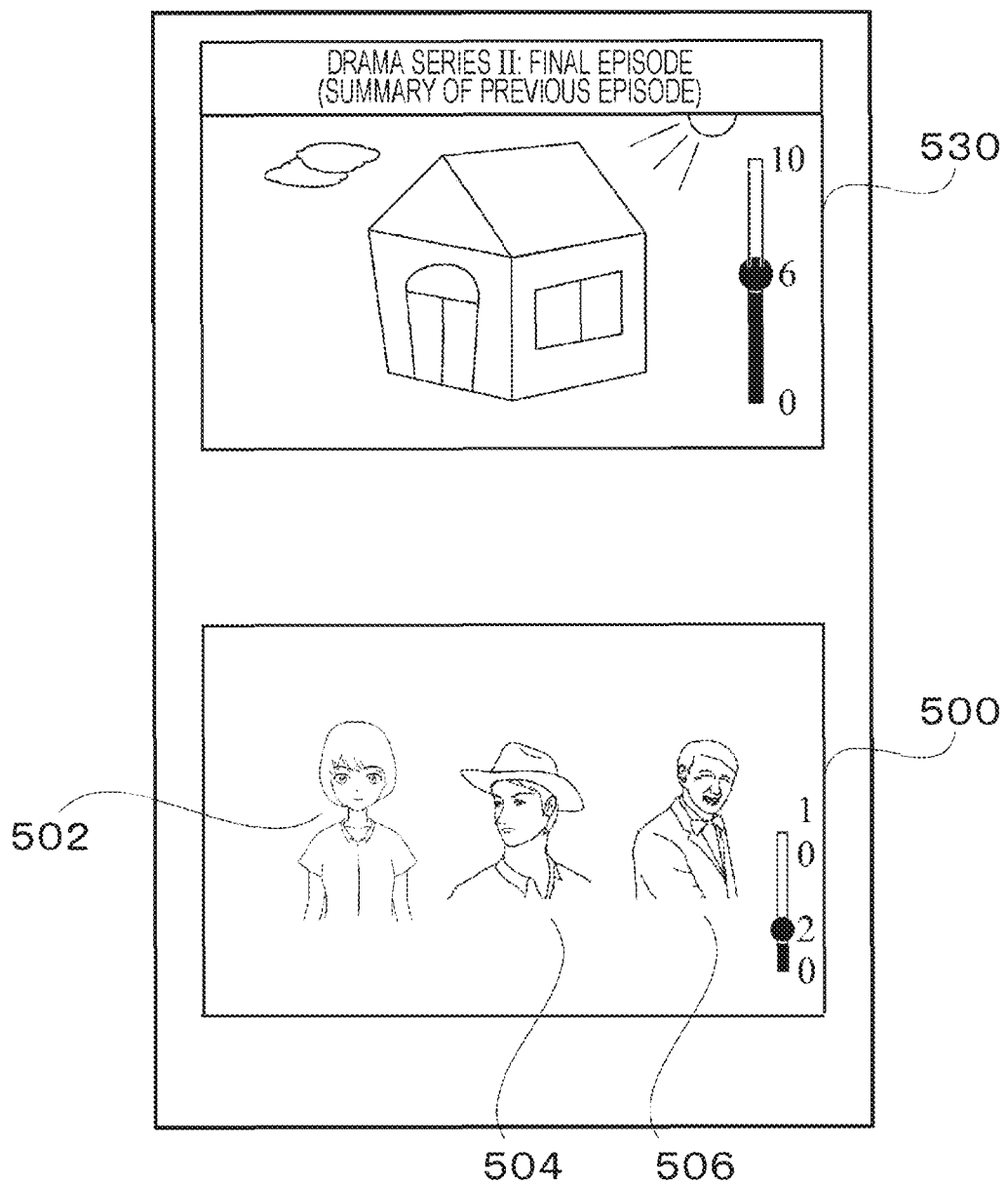
FIG. 17 schematically illustrates an example of the first video and the second video generated and displayed by each terminal apparatus used in relation to the collaborative distribution illustrated in FIG. 15.
Figure 18:
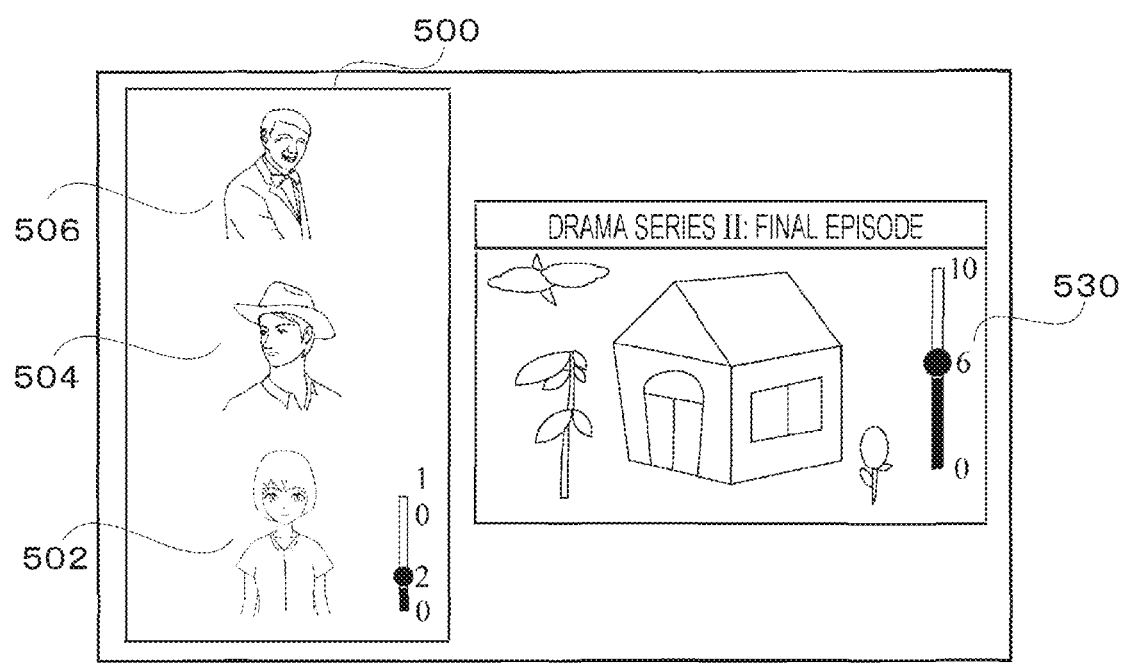
FIG. 18 schematically illustrates another example of the first video and the second video generated and displayed by each terminal apparatus used in relation to the collaborative distribution illustrated in FIG. 15.

Next, specific examples of a display mode of the first video and the second video applicable to at least one terminal apparatus 10 of the terminal apparatuses 10 of the viewers and the terminal apparatuses 10 of the distributors when such collaborative distribution is to be executed will be described with reference to FIGS. 17 and 18. FIG. 17 schematically illustrates an example of the first video and the second video generated and displayed by each terminal apparatus 10 used in relation to the collaborative distribution illustrated in FIG. 15. FIG. 18 illustrates another example of the first video and the second video generated and displayed by each terminal apparatus 10 used in relation to the collaborative distribution illustrated in FIG. 15.

First, as illustrated in FIG. 17, when displaying a first video and a second video, the terminal apparatus 10 can first split the display region of the terminal apparatus 10 to generate a plurality of display regions (e.g., an upper display region and a lower display region). Moreover, the terminal apparatus 10 can display the first video 500 in one of the plurality of display regions, and display the second video 530 in the other one of the plurality of display regions. As an alternative to the example in FIG. 17 in which the terminal apparatus 10 displays the first video 500 in the lower display region and the second video 530 in the upper display region, the terminal apparatus 10 may display the first video 500 in the upper display region and the second video 530 in the lower display region.

When displaying both the first video 500 and the second video 530 (e.g., FIG. 17), the terminal apparatus 10 has to reduce the available display region for displaying the first video 500, as compared with a case where the first video 500 alone is to be displayed and the second video 530 is not to be displayed (e.g., FIG. 16). Furthermore, when collaborative distribution is to be executed, it is necessary to arrange avatars of a plurality of distributors in the first video 500.

When the terminal apparatus 10 is to generate a first video by using the configuration data of the terminal apparatuses 10 of the distributors in a situation where collaborative distribution is being executed, the terminal apparatus 10 can generate the first video 500 in which the avatar 502 of the host distributor A, the avatar 504 of the first guest distributor E, and the avatar 506 of the second guest distributor F are arranged in line in the horizontal direction, as illustrated in FIG. 17.

On the other hand, when the terminal apparatus 10A of the host distributor A is to generate a first video by using the configuration data of the terminal apparatuses 10 of the distributors and transmit the first video to the terminal apparatuses 10 of the viewers in a situation where collaborative distribution is being executed, the terminal apparatus 10A can generate the first video 500 in which the avatar 502 of the host distributor A, the avatar 504 of the first guest distributor E, and the avatar 506 of the second guest distributor F are arranged in line in the horizontal direction, as illustrated in FIG. 17, and transmit the first video 500 to the terminal apparatuses 10 of the viewers via the BC server apparatus 20A.

On the other hand, referring to the example illustrated in FIG. 18, when displaying a first video and a second video, the terminal apparatus 10 can first split the display region of the terminal apparatus 10 to generate a plurality of display regions (e.g., a right display region and a left display region). Moreover, the terminal apparatus 10 can display the first video 500 in one of the plurality of display regions, and display the second video 530 in the other one of the plurality of display regions. As an alternative to the example in FIG. 18 in which the terminal apparatus 10 displays the first video 500 in the left display region and the second video 530 in the right display region, the terminal apparatus 10 may display the first video 500 in the right display region and the second video 530 in the left display region.

As described above, when displaying both the first video 500 and the second video 530 (e.g., FIG. 18), the terminal apparatus 10 has to reduce the available display region for displaying the first video 500, as compared with a case where the first video 500 alone is to be displayed and the second video 530 is not to be displayed (e.g., FIG. 16). Furthermore, when collaborative distribution is to be executed, it is necessary to arrange avatars of a plurality of distributors in the first video 500.

When the terminal apparatus 10 is to generate a first video by using the configuration data of the terminal apparatuses 10 of the distributors in a situation where collaborative distribution is being executed, the terminal apparatus 10 can generate the first video 500 in which the avatar 502 of the host distributor A, the avatar 504 of the first guest distributor E, and the avatar 506 of the second guest distributor F are arranged in line in the vertical direction, as illustrated in FIG. 18.

On the other hand, when the terminal apparatus 10A of the host distributor A is to generate a first video by using the configuration data of the terminal apparatuses 10 of the distributors and transmit the first video to the terminal apparatuses 10 of the viewers in a situation where collaborative distribution is being executed, the terminal apparatus 10A can generate the first video 500 in which the avatar 502 of the host distributor A, the avatar 504 of the first guest distributor E, and the avatar 506 of the second guest distributor F are arranged in line in the vertical direction, as illustrated in FIG. 18, and transmit the first video 500 to the terminal apparatuses 10 of the viewers via the BC server apparatus 20A.

Figure 19:
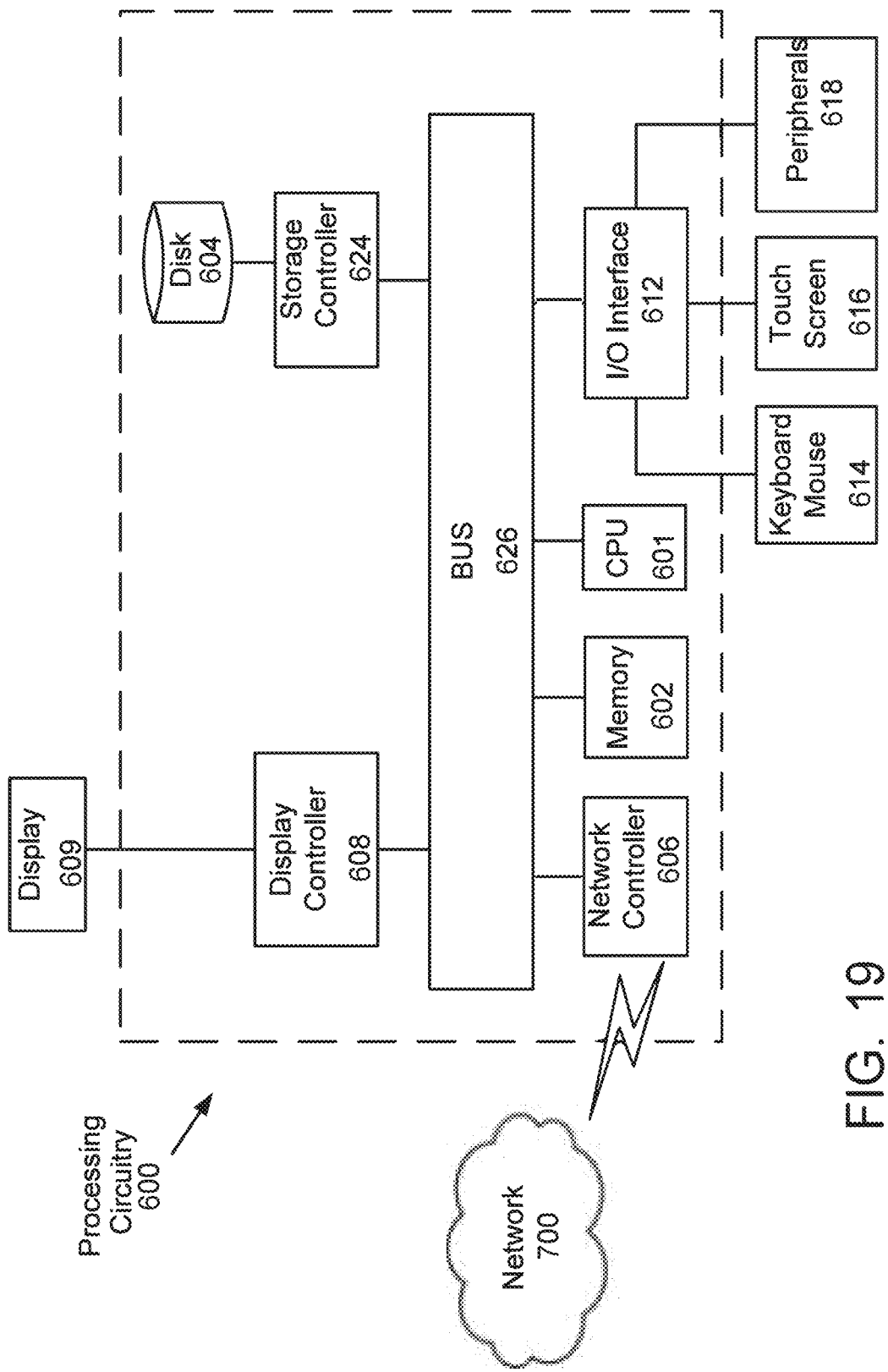
FIG. 19 is a block diagram of processing circuitry that performs computer-based operations in accordance with the present disclosure.

FIG. 19 is a block diagram of processing circuitry that performs computer-based operations in accordance with the present disclosure. FIG. 19 illustrates processing circuitry 600, corresponding to central processing unit 11 of terminal apparatus 10 and central processing unit 21 of server apparatus 20.

Processing circuitry 600 is used to control any computer-based and cloud-based control processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions can be executed out of order from that shown or discussed, including substantially concurrently or in reverse order, depending upon the functionality involved, as would be understood by those skilled in the art. The functionality of the elements disclosed herein may be implemented using circuitry or processing circuitry which may include general purpose processors, special purpose processors, integrated circuits, ASICs ("Application Specific Integrated Circuits"), conventional circuitry and/or combinations thereof which are configured or programmed to perform the disclosed functionality. Processors are processing circuitry or circuitry as they include transistors and other circuitry therein. The processor may be a programmed processor which executes a program stored in a memory. In the disclosure, the processing circuitry, units, or means are hardware that carry out or are programmed to perform the recited functionality. The hardware may be any hardware disclosed herein or otherwise known which is programmed or configured to carry out the recited functionality.

In FIG. 19, the processing circuitry 600 includes a CPU 601 which performs one or more of the control processes discussed in this disclosure. The process data and instructions may be stored in memory 602. These processes and instructions may also be stored on a storage medium disk 604 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other non-transitory computer readable medium of an information processing device with which the processing circuitry 600 communicates, such as a server or computer. The processes may also be stored in network based storage, cloud-based storage or other mobile accessible storage and executable by processing circuitry 600.

Further, the claimed advancements may be provided as a utility application, background daemon, or component of an operating system, or combination thereof, executing in conjunction with CPU 601 and an operating system such as Microsoft Windows, UNIX, Solaris, LINUX, Apple MAC-OS, Apple iOS and other systems known to those skilled in the art.

The hardware elements in order to achieve the processing circuitry 600 may be realized by various circuitry elements. Further, each of the functions of the above described embodiments may be implemented by circuitry, which includes one or more processing circuits. A processing circuit includes a particularly programmed processor, for example, processor (CPU) 601, as shown in FIG. 19. A processing circuit also includes devices such as an application specific integrated circuit (ASIC) and conventional circuit components arranged to perform the recited functions.

In FIG. 19, the processing circuitry 600 may be a computer or a particular, special-purpose machine. Processing circuitry 600 is programmed to execute processing to control money handling apparatus 1.

Alternatively, or additionally, the CPU 601 may be implemented on an FPGA, ASIC, PLD or using discrete logic circuits, as one of ordinary skill in the art would recognize. Further, CPU 601 may be implemented as multiple processors cooperatively working in parallel to perform the instructions of the inventive processes described above.

The processing circuitry 600 in FIG. 19 also includes a network controller 606, such as an Ethernet PRO network interface card, for interfacing with network 700. As can be appreciated, the network 700 can be a public network, such as the Internet, or a private network such as a local area network (LAN) or wide area network (WAN), or any combination thereof and can also include Public Switched Telephone Network (PSTN) or Integrated Services Digital Network (ISDN) sub-networks. The network 700 can also be wired, such as an Ethernet network, universal serial bus (USB) cable, or can be wireless such as a cellular network including EDGE, 3G and 4G wireless cellular systems. The wireless network can also be Wi-Fi, wireless LAN, Bluetooth, or any other wireless form of communication that is known. Additionally, network controller 606 may be compliant with other direct communication standards, such as Bluetooth, a near field communication (NFC), infrared ray or other.

The processing circuitry 600 further includes a display controller 608, such as a graphics card or graphics adaptor for interfacing with display 609, such as a monitor. An I/O interface 612 interfaces with a keyboard and/or mouse 614 as well as a touch screen panel 616 on or separate from display 109. I/O interface 612 also connects to a variety of peripherals 618.

The storage controller 624 connects the storage medium disk 604 with communication bus 626, which may be an ISA, EISA, VESA, PCI, or similar, for interconnecting all of the components of the processing circuitry 600. A description of the general features and functionality of the display 609, keyboard and/or mouse 614, as well as the display controller 608, storage controller 624, network controller 606, and I/O interface 612 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

According to the various embodiments described above, the first server apparatus, which distributes the first video containing the animation of the avatar of the distributor to the terminal apparatus of each viewer, and the second server apparatus, which distributes the second video prepared separately from the first video to the terminal apparatus of the distributor and the terminal apparatus of each viewer, are provided independently of each other. Accordingly, in the system in which the first video containing the animation of the avatar of the distributor is transmitted to the terminal apparatus of each viewer, the distributor and the viewer can together enjoy viewing the second video prepared separately from the first video.

Furthermore, the terminal apparatus of the distributor can transmit, to the terminal apparatus of each viewer via the first server apparatus that distributes the first video, playback data containing access data stored in the second server apparatus and indicating a method for accessing the second video currently played back by the terminal apparatus of the distributor and/or indication data indicating operation to be performed on the second video by the terminal apparatus of each viewer in synchronization with the playback of the second video by the terminal apparatus of the distributor. Accordingly, the terminal apparatus of each viewer can access the second server apparatus and play back the second video received from the second server apparatus in accordance with the playback data. Consequently, the terminal apparatus of each viewer can play back the second video at a timing substantially synchronous with the playback of the second video by the terminal apparatus of the distributor.

Furthermore, in a search period that continues from the time point when the terminal apparatus of the distributor accesses the second server apparatus (i.e., ST 406 in FIG. 6A) to the time point when the terminal apparatus of the distributor starts to receive the second video selected by the terminal apparatus of the distributor from the second server apparatus (i.e., ST 412), the first server apparatus does not transmit data received by the terminal apparatus of the distributor from the second server apparatus (e.g., a webpage received from the second server apparatus) to the terminal apparatus of each viewer. Accordingly, when the terminal apparatus of the distributor accesses the second server apparatus, the occurrence of a situation where personal information input by the distributor via the user interface (such as a user ID and a password used for logging into the second server apparatus, as well as the history of videos previously received by the distributor from the second server apparatus) is mistakenly transmitted to the terminal apparatus of each viewer can be suppressed.

Furthermore, the various embodiments described above do not employ a configuration in which a single server apparatus distributes configuration data (or a first video) and a second video to the terminal apparatus of each viewer and distributes the second video to the terminal apparatus of the distributor. In actuality, the server apparatus (i.e., the first server apparatus) that distributes the configuration data (or the first video) to the terminal apparatus of each viewer and the server apparatus (i.e., the second server apparatus) that distributes the second video to the terminal apparatus of each viewer and the terminal apparatus of the distributor are provided independently of each other.

Accordingly, the second server apparatus does not have to distribute the configuration data (or the first video) to the terminal apparatus of each viewer, but simply transmits the second video basically to the terminal apparatus of each viewer and the terminal apparatus of the distributor. This can suppress the occurrence of a situation where a relatively large time lag occurs between the time point when the second video, which tends to have a relatively large volume, reaches the terminal apparatus of each viewer and the time point when the second video reaches the terminal apparatus of the distributor, due to the communication resource or bandwidth being taken by the transmission of the configuration data (or the first video).

On the other hand, the first server apparatus does not have to distribute the second video, which tends to have a relatively large volume, to the terminal apparatus of each viewer, but simply distributes the configuration data (or the first video) basically to the terminal apparatus of each viewer. This can suppress the occurrence of a situation where a relatively large time lag occurs between the time point when the terminal apparatus of each viewer displays the first video after the configuration data (or the first video) reaches the terminal apparatus of each viewer and the time point when the terminal apparatus of the distributor displays the first video.

Furthermore, according to the various embodiments described above, the server apparatus (i.e., the first server apparatus) that distributes the configuration data (or the first video) to the terminal apparatus of each viewer and the server apparatus (i.e., the second server apparatus) that distributes the second video to the terminal apparatus of each viewer and the terminal apparatus of the distributor are provided independently of each other. Accordingly, the first server apparatus does not distribute the second video stored or prepared by the second server apparatus to the terminal apparatus of each viewer or the terminal apparatus of the distributor. Specifically, each terminal apparatus can receive the entire second video not from the first server apparatus but directly from the second server apparatus. Therefore, in a case where the company that manages the first server apparatus and the company that manages the second server apparatus are different from each other, the company that manages the first server apparatus does not infringe the copyright of the second video held by the company that manages the second server apparatus. Accordingly, without infringing the copyright of the second video held by the company that manages the second server apparatus, the company that manages the first server apparatus can provide the second video to the terminal apparatus of the distributor and the terminal apparatus of each viewer.

The various embodiments described above may be achieved by being combined with each other, so long as a contradiction or a disadvantage does not occur.

The entire contents of Japanese Unexamined Patent Application Publication No. 2020-39029 is incorporated by reference.

In view of many possible embodiments to which principles of this disclosure may be applied, the various exemplified embodiments are merely various preferred examples, and it is be noted that the technical scope of the present disclosure according to the claims should not be limited to these various preferred examples. In actuality, the technical scope of the present disclosure according to the claims is defined by the appended claims. Therefore, it is demanded that everything that belongs to the technical scope of the present disclosure described in the claims is to be patented as the present disclosure of the present inventors.

What is claimed is:

1. A terminal apparatus of a distributor, the terminal apparatus comprising:
a transceiver; and
processing circuitry configured to:
control the transceiver to transmit, to a first terminal apparatus of a viewer via a first server apparatus, configuration data including audio data and motion data,
wherein:
the audio data includes speech spoken by the distributor,
the motion data includes data indicating motion of a face of the distributor while the distributor speaks the speech, and
in response to the configuration data, the first terminal apparatus of the viewer generates a first video of an avatar corresponding to the distributor based on the audio data and the motion data of the configuration data;
activate and execute a video reception application in accordance with an operation performed by the distributor using a user interface of the terminal apparatus of the distributor; and
in response to the distributor selecting a second server apparatus from among a plurality of server apparatuses after activating the video reception application:
receive a second video from the second server apparatus,
play the first video and the second video simultaneously on different display regions of a display screen of the terminal apparatus of the distributor, the first video including a first slider for adjusting a level of audio signal of the first video independent from a level of audio signal of the second video, and the second video including a second slider for adjusting the level of audio signal of the second video independent from the level of audio signal from the first video,
designate predetermined access data in the video reception application to the first terminal apparatus of the viewer,
control playback of the second video, wherein the second server apparatus is different from the first server apparatus, and
control the transceiver to transmit playback data to the first terminal apparatus of the viewer via the first server apparatus, and
wherein:
the first video, generated by the first terminal apparatus of the viewer, includes the avatar moving with motion corresponding to the motion of the face of the distributor while speaking the speech, the playback data includes access data and indication data, the access data indicates a method for accessing the second video stored in the second server apparatus and played back by the terminal apparatus, and the indication data indicates an operation to be performed on the second video by the first terminal apparatus of the viewer in synchronization with playback of the second video by the terminal apparatus.

2. The terminal apparatus according to claim 1, wherein the processing circuitry is further configured to control the transceiver to transmit the playback data to the first terminal apparatus of the viewer via the first server apparatus at every fixed or variable unit time.

3. The terminal apparatus according to claim 1, wherein the processing circuitry is further configured to control the transmitter to transmit the indication data to the first terminal apparatus of the viewer to stop playing back the second video in a case that the processing circuitry controls a stop of playing back the second video, the indication data fixing a playback position of the second video or including a command for stopping the second video.

4. The terminal apparatus according to claim 3, wherein the processing circuitry is further configured to control the transmitter to transmit the indication data to the first terminal apparatus of the viewer to resume the playback of the second video in a case that the processing circuitry controls a resumption of the playback of the second video, the indication data temporally changing the playback position of the second video or including a command for playing back the second video.

5. The terminal apparatus according to claim 1, wherein receiving the second video from the second server apparatus includes:

the transceiver receiving playback candidate data related to a plurality of videos serving as playback candidates from the second server apparatus, and the transceiver receiving a video requested by the terminal apparatus from the second server apparatus, the video requested being one of the plurality of videos.

6. The terminal apparatus according to claim 5, wherein the processing circuitry is further configured to control the transceiver to not transmit the playback candidate data and the second video to the first terminal apparatus of the viewer via the first server apparatus.

7. The terminal apparatus according to claim 5, wherein for the transceiver to receive the second video from the second server apparatus, the processing circuitry controls the transceiver to transmit the access data to the second server apparatus, the access data identifying the second video selected by the terminal apparatus from the plurality of videos.

8. The terminal apparatus according to claim 5, wherein the terminal apparatus is of a host distributor distributing the first video in collaboration with another terminal apparatus of a guest distributor, the processing circuitry is further configured to control the transceiver to transmit first configuration data generated by the terminal apparatus to the another terminal apparatus of the guest distributor via the first server apparatus, the first configuration data at least including audio data and motion data, the transceiver receives second configuration data generated by the another terminal apparatus of the guest distributor from the another terminal apparatus of the guest distributor via the first server apparatus, the second configuration data at least including audio data and motion data, the processing circuitry is further configured to generate the first video containing the avatar of the host distributor and an avatar of the guest distributor by using the first configuration data of the terminal apparatus and the second configuration data of the another terminal apparatus of the guest distributor, the transceiver receives the playback candidate data related to the plurality of videos serving as the playback candidates from the second server apparatus, and the transceiver receives the second video requested by the terminal apparatus from the second server apparatus, the second video that is requested being one of the plurality of videos.

9. The terminal apparatus according to claim 8, wherein a randomly selected one of the terminal apparatus and the another terminal apparatus of the guest distributor receives the playback candidate data from the second server apparatus.

10. The terminal apparatus according to claim 5, wherein the terminal apparatus is of a guest distributor distributing the first video in collaboration with another terminal apparatus of a host distributor, the processing circuitry is configured to control the transceiver to transmit first configuration data generated by the terminal apparatus to the another terminal apparatus of the host distributor via the first server apparatus, the first configuration data at least including audio data and motion data, the transceiver receives second configuration data generated by the another terminal apparatus of the host distributor from the another terminal apparatus of the host distributor via the first server apparatus, the second configuration data at least including audio data and motion data;

the processing circuitry is configured to generate the first video containing the avatar of the guest distributor and an avatar of the host distributor by using the first configuration data of the terminal apparatus and the second configuration data of the another terminal apparatus of the host distributor, the transceiver receives the playback candidate data related to the plurality of videos serving as the playback candidates from the second server apparatus, and the transceiver receives the second video requested by the terminal apparatus from the second server apparatus, the second video that is requested being one of the plurality of videos.

11. The terminal apparatus according to claim 1, wherein the transceiver receives a participant list indicating viewers or guest distributors.

12. The terminal apparatus according to claim 11, wherein the transceiver transmits the configuration data to a server apparatus which forwards the configuration data to terminal apparatuses of the guest distributors.

13. A method executed by processing circuitry of a terminal apparatus of a distributor, the method comprising:

controlling a transceiver of the terminal apparatus to transmit, to a first terminal apparatus of a viewer via a first server apparatus, configuration data including audio data and motion data, wherein:

the audio data includes speech spoken by the distributor, and the motion data includes data indicating motion of a face of the distributor while the distributor speaks the speech, in response to the configuration data, the first terminal apparatus of the viewer generates a first video of an avatar corresponding to the distributor based on the audio data and the motion data of the configuration data, activating and executing a video reception application in accordance with an operation performed by the distributor using a user interface of the terminal apparatus of the distributor;

in response to the distributor selecting a second server apparatus from among a plurality of server apparatuses after activating the video reception application:

receiving a second video from the second server apparatus, playing the first video and the second video simultaneously on different display regions of a display screen of the terminal apparatus of the distributor, the first video including a first slider for adjusting a level of audio signal of the first video independent from a level of audio signal of the second video, and the second video including a second slider for adjusting the level of audio signal of the second video independent from the level of audio signal from the first video, designating predetermined access data in the video reception application to the first terminal apparatus of the viewer, and controlling playback of the second video, wherein the second server apparatus is different from the first server apparatus and the second server apparatus distributes the second video to the terminal apparatus and to the first terminal apparatus of the viewer, and controlling the transceiver to transmit playback data to the first terminal apparatus of the viewer via the first server apparatus, and wherein:

the first video, generated by the first terminal apparatus of the viewer, includes the avatar moving with motion corresponding to the motion of the face of the distributor while speaking the speech, the playback data includes access data and indication data, the access data indicates a method for accessing the second video stored in the second server apparatus and played back by the terminal apparatus, and the indication data indicates an operation to be performed on the second video by the first terminal apparatus of the viewer in synchronization with playback of the second video by the terminal apparatus.

14. The method according to claim 13, further comprising:

controlling the transceiver to transmit the playback data to the first terminal apparatus of the viewer via the first server apparatus at every fixed or variable unit time.

15. The method according to claim 13, further comprising:

controlling the transmitter to transmit the indication data to the first terminal apparatus of the viewer to stop playing back the second video in a case that a stop of playing back the second video, the indication data fixing a playback position of the second video or including a command for stopping the second video is performed.

16. The method according to claim 15, further comprising:

controlling the transmitter to transmit the indication data to the first terminal apparatus of the viewer to resume the playback of the second video in a case a resumption of the playback of the second video, the indication data temporally changing the playback position of the second video or including a command for playing back the second video is performed.

17. The method according to claim 13, wherein receiving the second video from the second server apparatus includes:

receiving playback candidate data related to a plurality of videos serving as playback candidates from the second server apparatus, and receiving a video requested by the terminal apparatus from the second server apparatus, the video requested being one of the plurality of videos.

18. The method according to claim 17, further comprising:

controlling the transceiver to not transmit the playback candidate data and the second video to the first terminal apparatus of the viewer via the first server apparatus.

19. The method according to claim 17, wherein for the transceiver to receive the second video from the second server apparatus, the method further comprises controlling the transceiver to transmit the access data to the second server apparatus, the access data identifying the second video selected by the terminal apparatus from the plurality of videos.

20. A non-transitory computer readable medium storing computer executable instructions which, when executed by processing circuitry of a terminal apparatus of a distributor, cause the processing circuitry to:

control a transceiver of the terminal apparatus to transmit, to a first terminal apparatus of a viewer via a first server apparatus, configuration data including audio data and motion data, wherein the audio data includes speech spoken by the distributor, the motion data includes data indicating motion of a face of the distributor while the distributor speaks the speech, and in response to the configuration data, the first terminal apparatus of the viewer generates a first video of an avatar corresponding to the distributor based on the audio data and the motion data of the configuration data, activate and execute a video reception application in accordance with an operation performed by the distributor using a user interface of the terminal apparatus of the distributor, in response to the distributor selecting a second server apparatus from among a plurality of server apparatuses after activating the video reception application:

receive a second video from the second server apparatus, play the first video and the second video simultaneously on different display regions of a display screen of the terminal apparatus of the distributor, the first video including a first slider for adjusting a level of audio signal of the first video independent from a level of audio signal of the second video, and the second video including a second slider for adjusting the level of audio signal of the second video independent from the level of audio signal from the first video, designate predetermined access data in the video reception application to the first terminal apparatus of the viewer,
control playback of the second video, wherein the second server apparatus is different from the first server apparatus and the second server apparatus distributes the second video to the terminal apparatus and to the first terminal apparatus of the viewer, and
controlling the transceiver to transmit playback data to the first terminal apparatus of the viewer via the first server apparatus, and wherein:
the first video, generated by the first terminal apparatus of the viewer, includes the avatar moving with motion corresponding to the motion of the face of the distributor while speaking the speech,
the playback data includes access data and indication data,
the access data indicates a method for accessing the second video stored in the second server apparatus and played back by the terminal apparatus, and
the indication data indicates an operation to be performed on the second video by the first terminal apparatus of the viewer in synchronization with playback of the second video by the terminal apparatus.

* * * * *